United States Patent [19]

Wallace

[11] Patent Number: 4,608,875
[45] Date of Patent: Sep. 2, 1986

[54] INERTIAL TRANSMISSION

[75] Inventor: Henry W. Wallace, Bradenton, Fla.

[73] Assignee: Wallace Associated Research, Lakewood, Colo.

[21] Appl. No.: 726,930

[22] Filed: Apr. 25, 1985

Related U.S. Application Data

[63] Continuation of Ser. No. 420,001, Sep. 20, 1982, abandoned.

[51] Int. Cl.[4] ............................................. F16H 33/08
[52] U.S. Cl. ......................................... 74/64; 74/751
[58] Field of Search .................... 74/64, 664, 705, 7.3, 74/720.5, 752 R, 751, 752 B

[56] References Cited

U.S. PATENT DOCUMENTS

| | | | |
|---|---|---|---|
| 1,914,865 | 6/1933 | Rath | 74/751 |
| 1,966,357 | 7/1934 | Palmer | 74/751 |
| 2,052,507 | 8/1936 | Walton | 74/751 |
| 2,091,211 | 8/1937 | Mattia | 74/752 F |
| 2,218,671 | 10/1940 | Broady | 74/64 |
| 2,639,631 | 5/1953 | Taylor | 74/751 |
| 2,984,124 | 5/1961 | Keyser | 74/752 F X |
| 3,251,442 | 5/1966 | Aschauer | 192/48.92 X |
| 3,267,770 | 8/1966 | Fry | 74/751 |
| 3,477,302 | 11/1969 | Webb | 192/41 R |
| 3,495,479 | 2/1970 | Rass | 74/751 |
| 3,734,222 | 5/1973 | Bradwick, III | 74/751 X |
| 3,851,545 | 12/1974 | Gumlich | 74/751 |
| 3,955,428 | 5/1976 | Ward | 74/64 |
| 4,050,317 | 9/1977 | Brandt | 74/64 |
| 4,161,889 | 7/1979 | Hinds | 74/751 X |
| 4,169,391 | 10/1979 | Schonberger | 74/751 X |

FOREIGN PATENT DOCUMENTS

| | | | |
|---|---|---|---|
| 31694 | 3/1927 | France | 74/751 |
| 715821 | 12/1931 | France | 74/751 |
| 204062 | 6/1924 | United Kingdom | 74/751 |
| 422577 | 1/1935 | United Kingdom | 74/751 |
| 435099 | 9/1935 | United Kingdom | 192/48.92 |

Primary Examiner—Lawrence Staab
Assistant Examiner—Dwight G. Diehl
Attorney, Agent, or Firm—Sheridan, Ross & McIntosh

[57] ABSTRACT

A transmission unit is provided for converting torque to angular velocity and angular velocity to torque using angular momentum. The conversion is automatically accomplished in a stepless fashion using inertial masses which, preferably, move along spherical paths. The transmission unit apparatus is coupled to a source of power. When the transmission unit is driven by the source of power about a primary axis, the radii-of-gyration of the inertial masses cyclically change to supply torque impulses of angular momentum change to an output shaft load. The torque impulses of angular momentum change, in conjunction with the concomitant, inherent, time-rate-of-change of rotational kinetic energy, automatically convert to torque/angular velocity ratios. The magnitude of the output torque and the magnitude of the output angular velocity depend upon the power source characteristics but, more particularly, upon the output load conditions.

6 Claims, 35 Drawing Figures

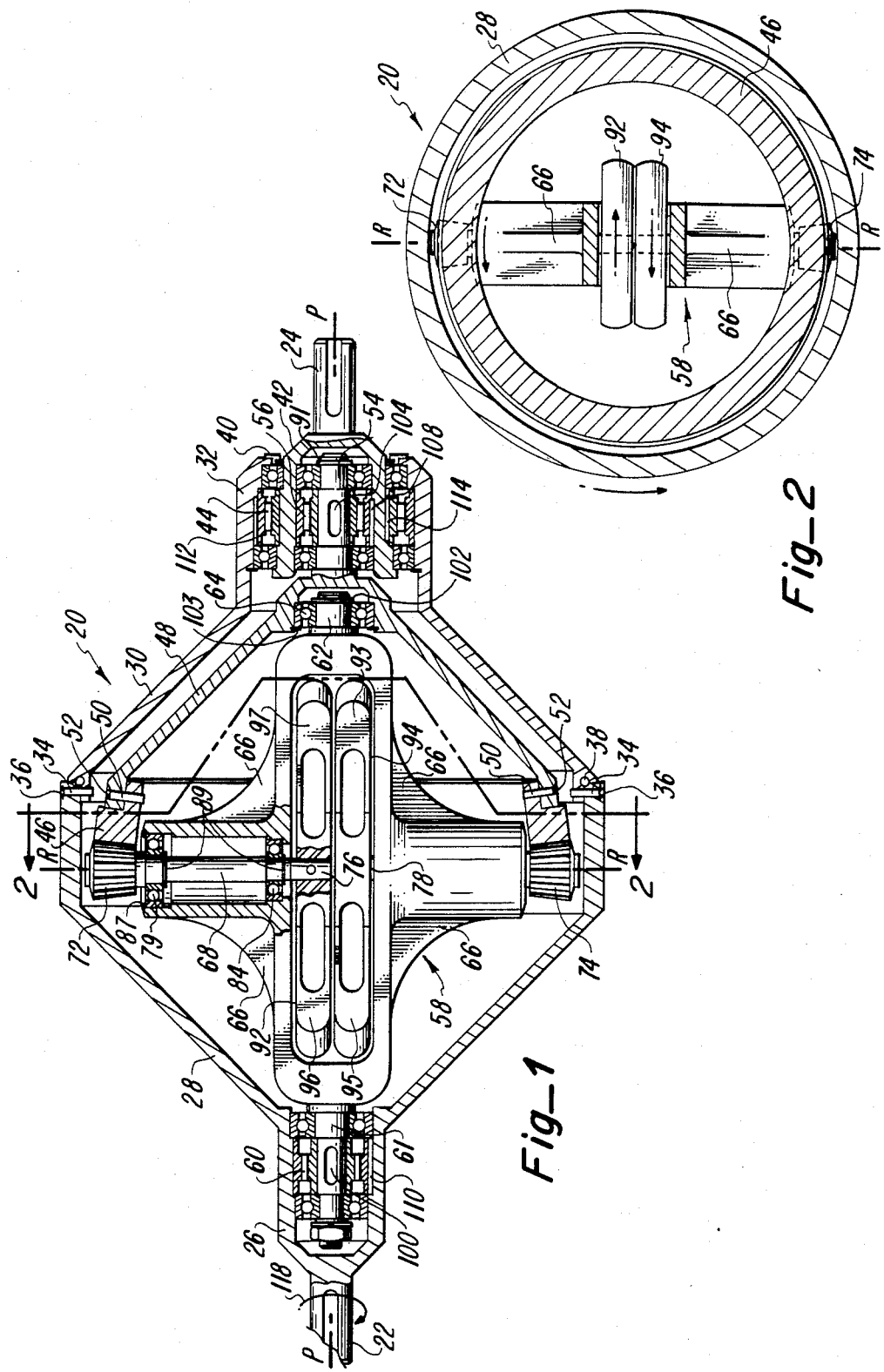

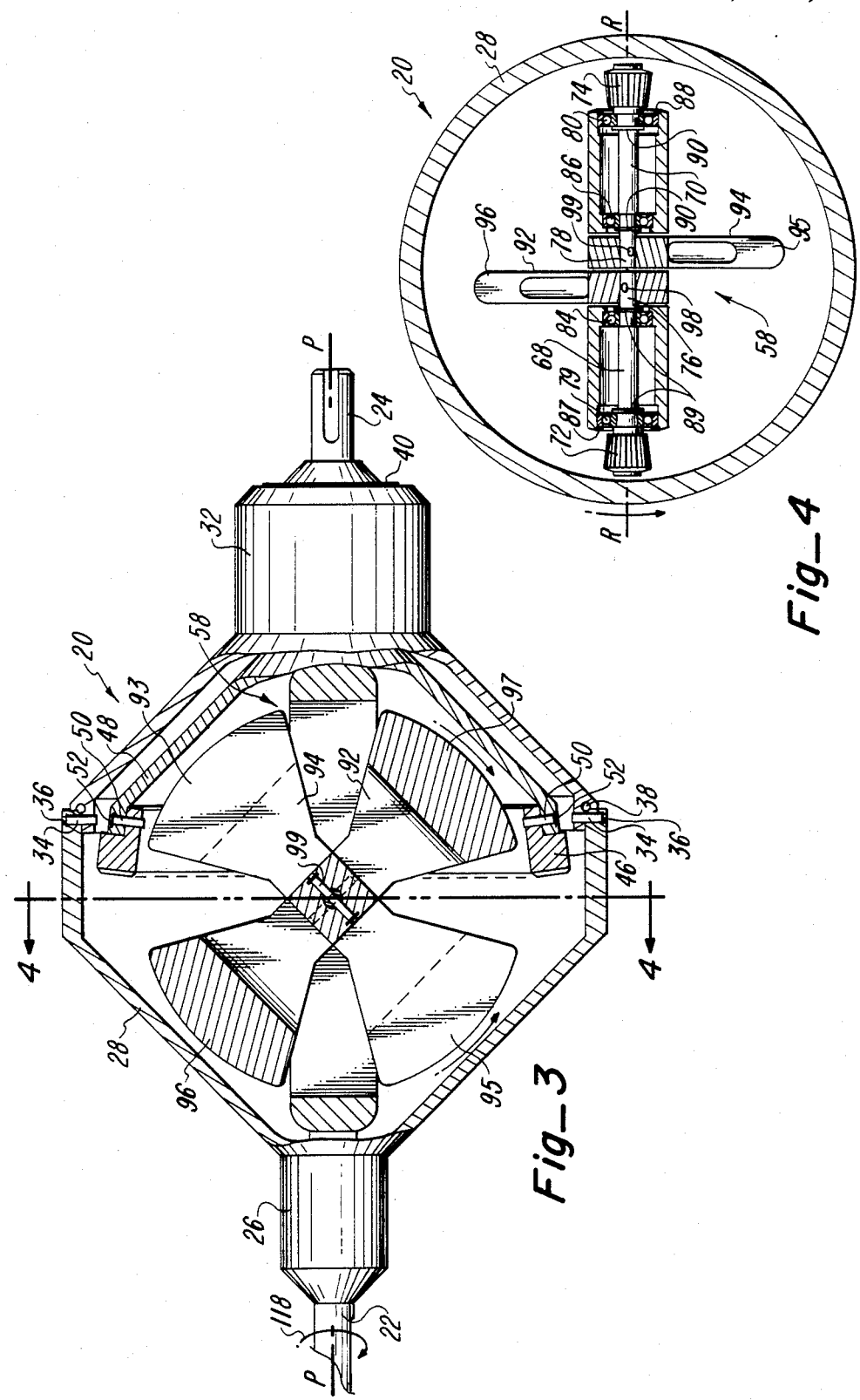

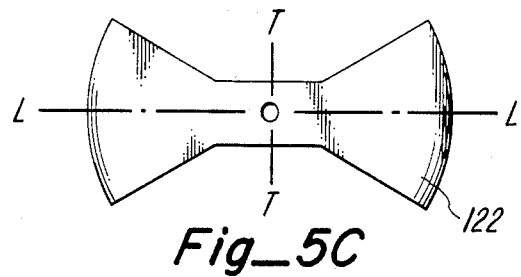
Fig_5C
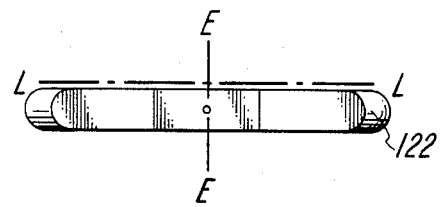
Fig_5D
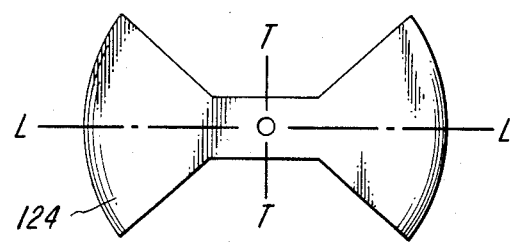
Fig_5E
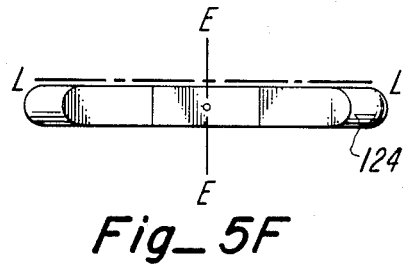
Fig_5F
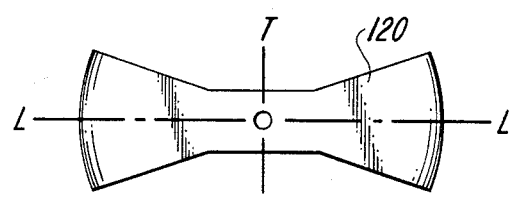
Fig_5A
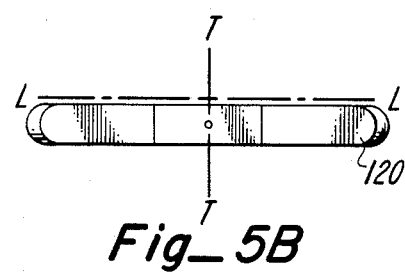
Fig_5B

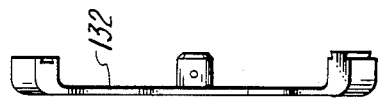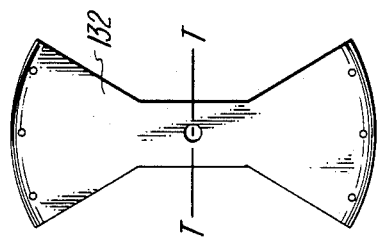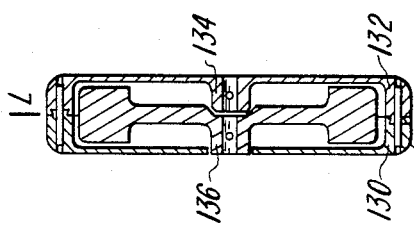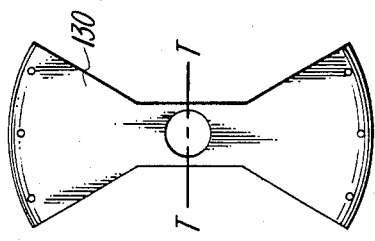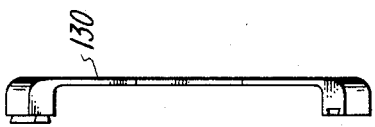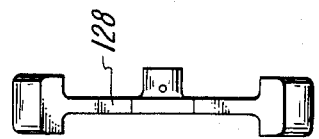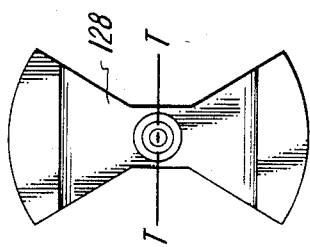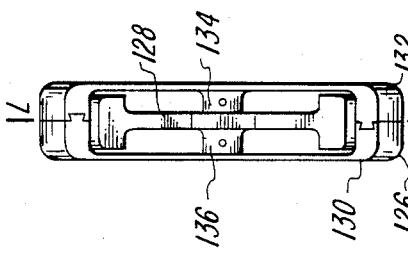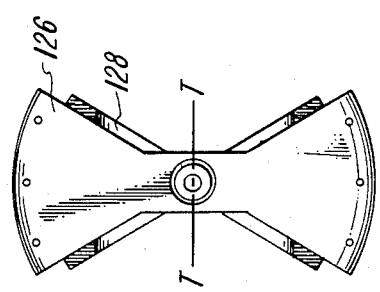

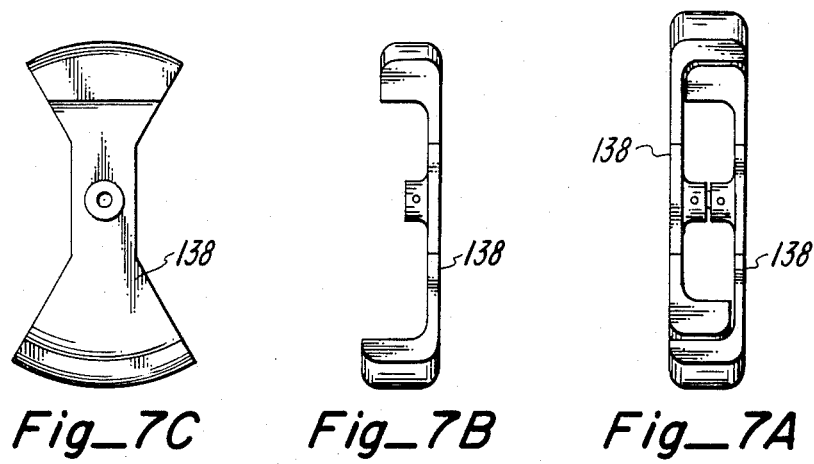
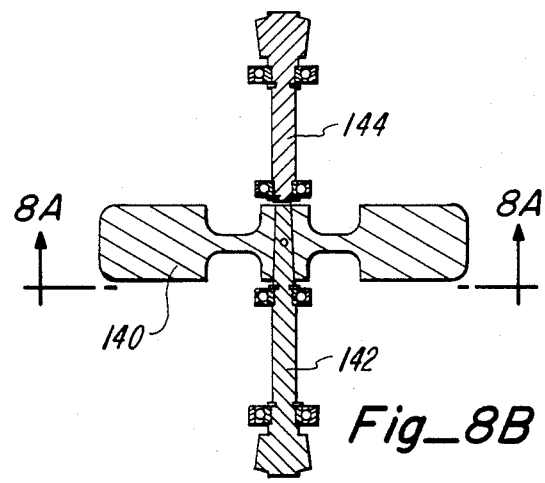
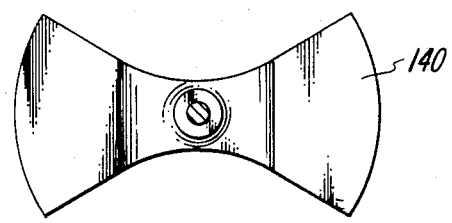

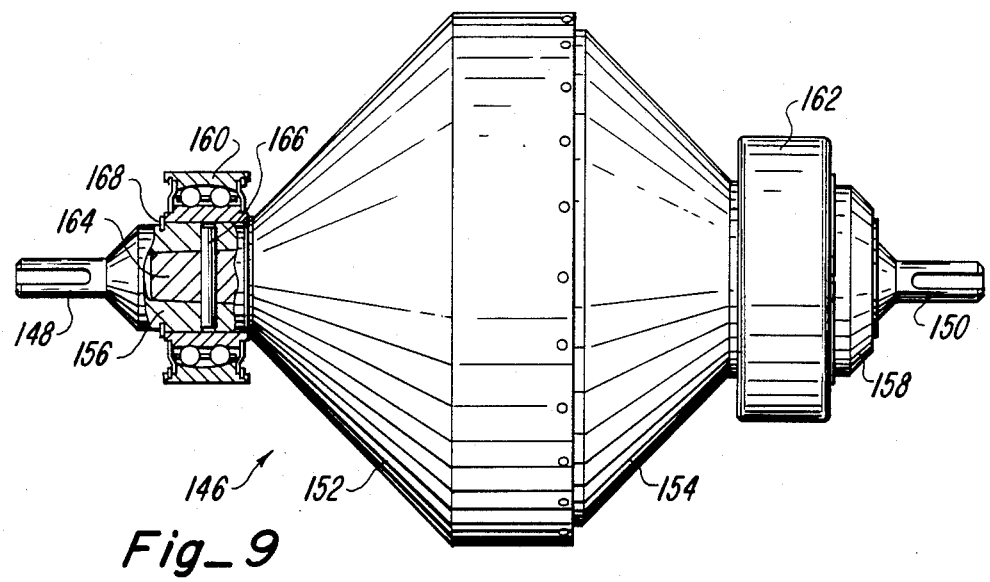
Fig_9
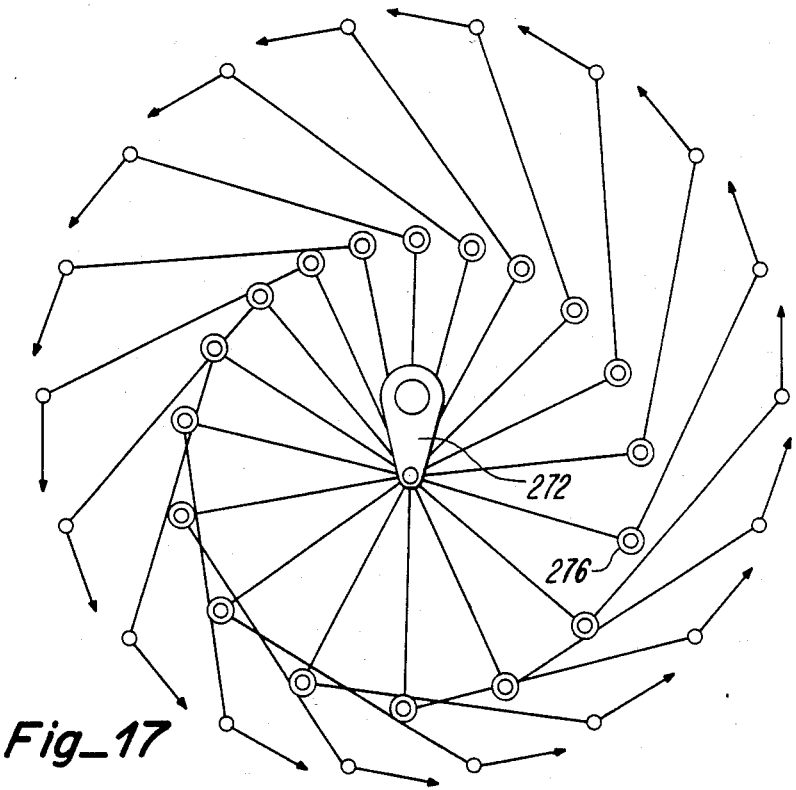
Fig_17

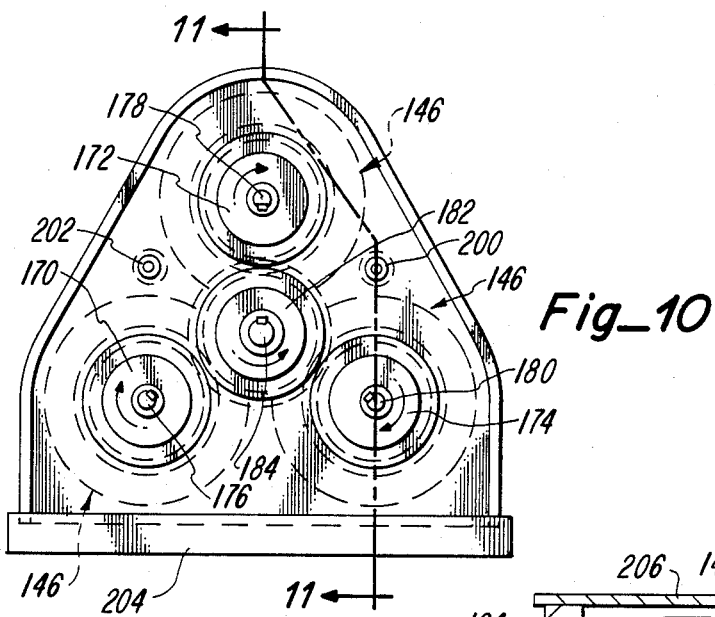
Fig_10
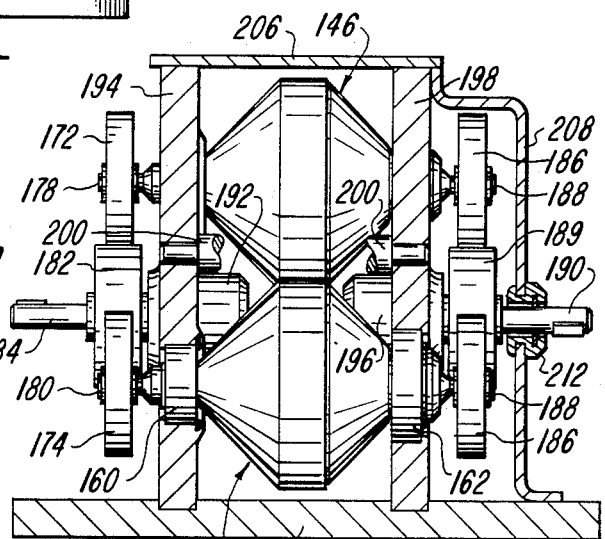
Fig_11
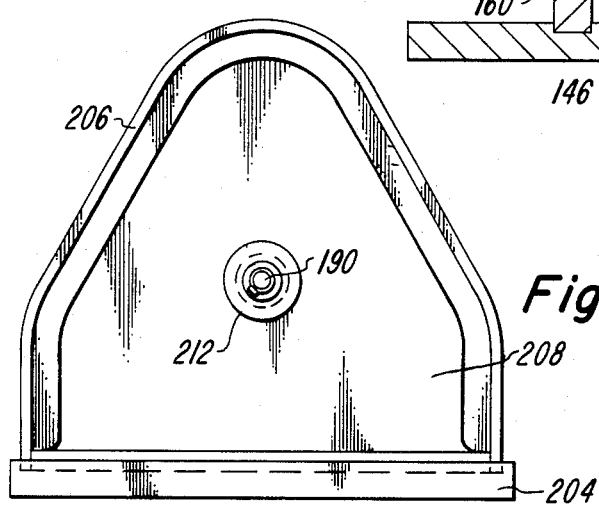
Fig_12

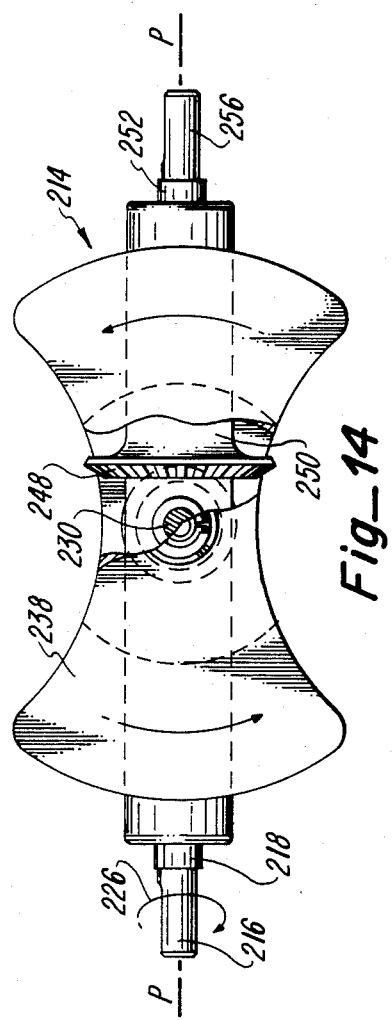
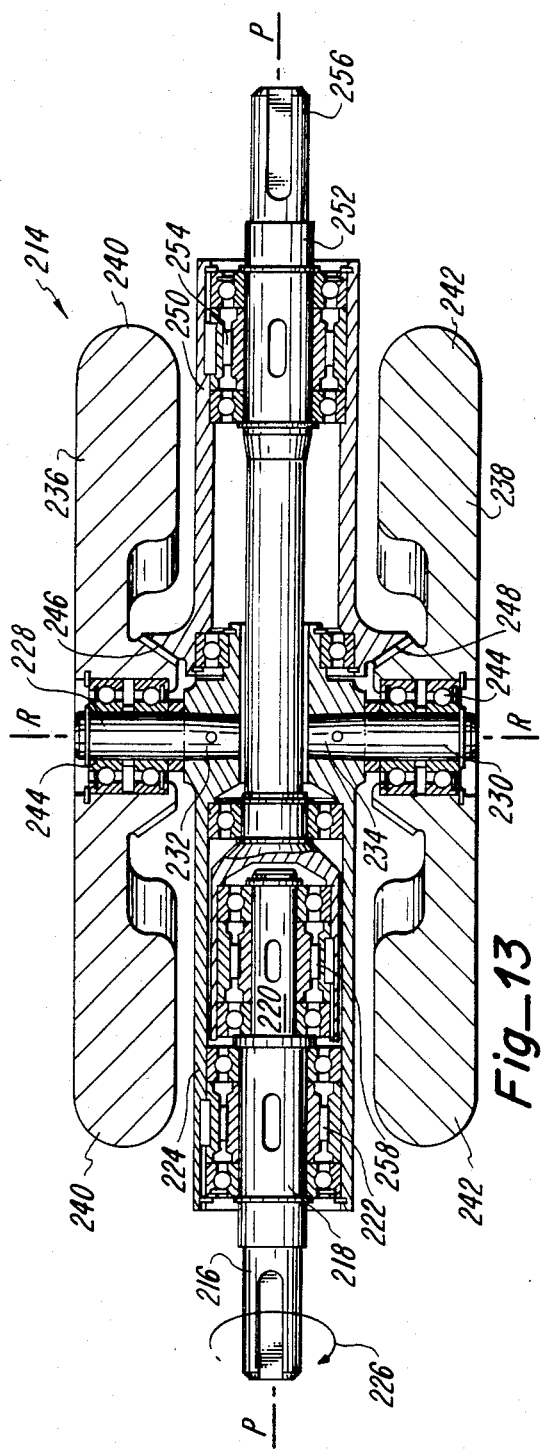

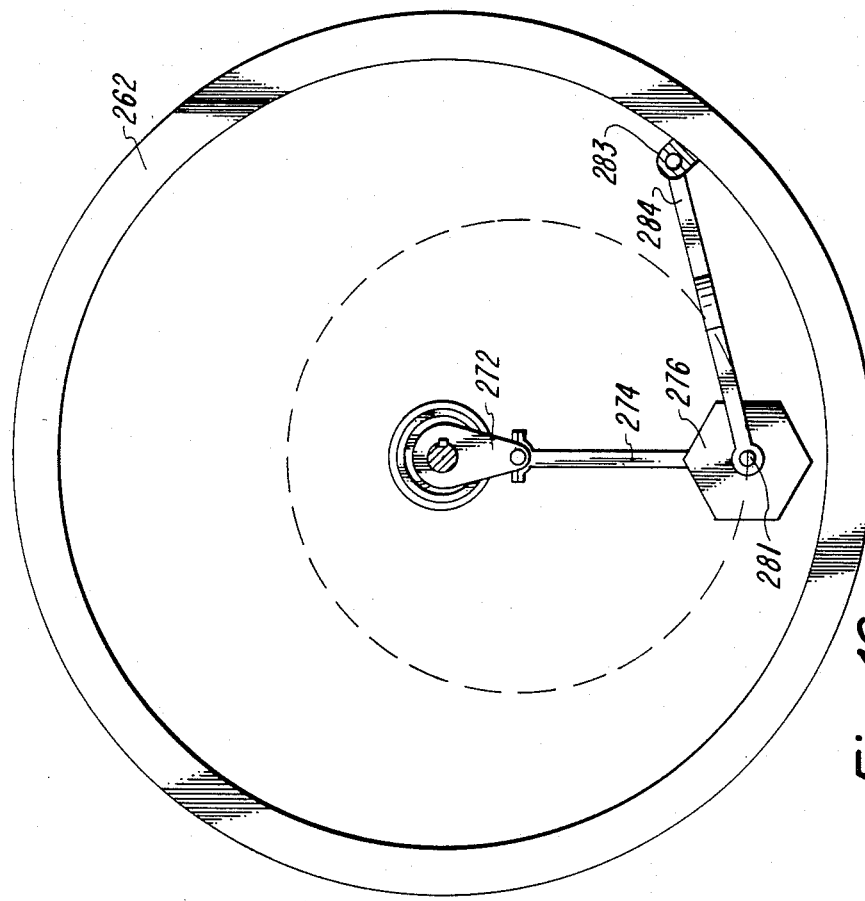
Fig_16
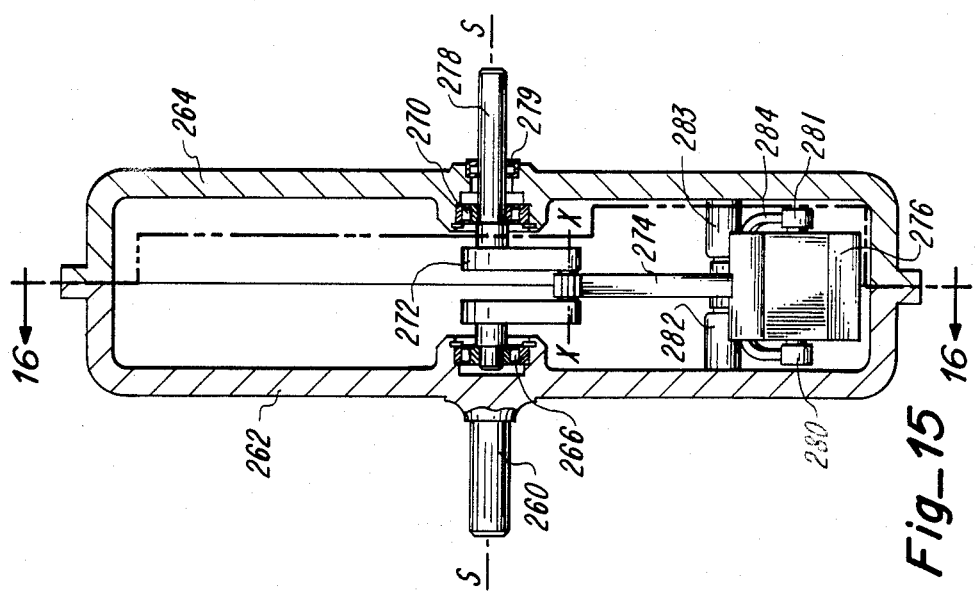
Fig_15

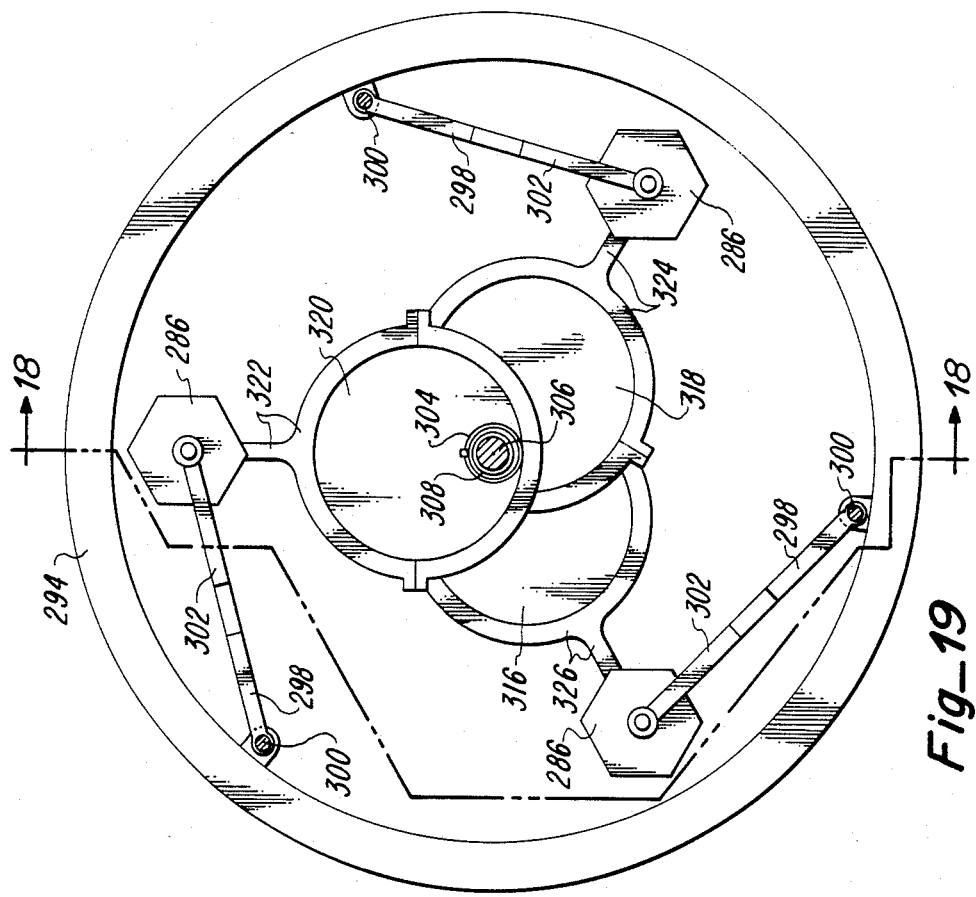
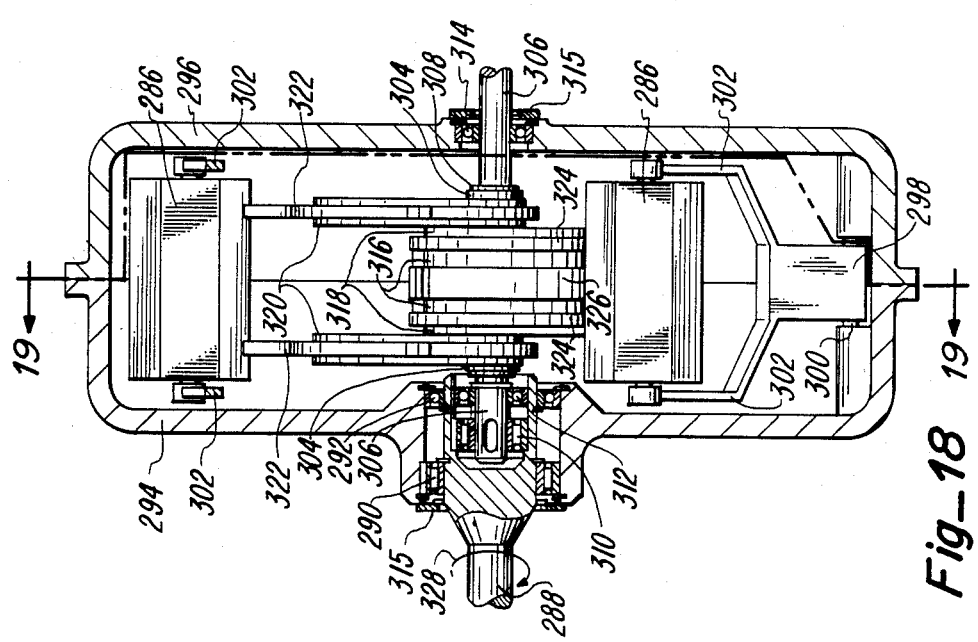

INERTIAL TRANSMISSION

This is a continuation, of application Ser. No. 420,001, filed Sept. 29, 1982.

FIELD OF THE INVENTION

This invention relates to an apparatus for transmitting power from an input shaft to an output shaft and, more particularly, to an apparatus for automatically and efficiently transforming the contained rotational kinetic energy, via its intrinsic angular momentum therein, into infinite-ratio combinations of output shaft torque and angular velocity parameters commensurate with load demand.

BACKGROUND ART

The present invention utilizes phenomena associated with angular momentum conservation of solid bodies in a novel and especially efficient way so as to create a stepless transmission capable of infinitely varying torque and angular velocity, within the limits of a particular device, and the process of transmitting power in the form of a time-rate-of-change of rotational kinetic energy. If insufficient torque is available for a given load demand, additional output torque is generated by the transmission at the expense of the output angular velocity. If excess output torque is present it is transformed into an additional increment of output angular velocity within the mechanism's constraints. This transmission consequently acts as a mechano-inertial load matcher between a power source and its load. Since useful power is transmitted by means of applying angular and radial accelerations—both positive and negative—to the transmission's respective momentum storage links—via the links' mass properties, this transmission invention is conceived as an "inertial" transmission in contrast to other transmissions which are characterized as "geared", "friction", "traction" and "hydraulic". Its uniqueness is the cyclical pumping, or transferring of momentum, from a power source into a dynamic link storage unit from where it is pumped or transferred into an output link along with its associated rotational kinetic energy so as to deliver infinitely-varying ratios of torque and angular velocity in accordance with the changing requirements of the load.

It is well known that angular momentum L, when conserved in a mass system, causes the system's angular velocity $\omega$ to change inversely with the system's moment of momentum or, synonomously, moment of inertia I because of the following mathematical relationships of these parameters to one another: $L=I\omega$, $\omega=L/I$ and $I=L/\omega$. The rotational kinetic energy developed in a rotating system is expressed as $\frac{1}{2}I\omega^2$. Because the rotational kinetic energy is transmitted through the transmission at varying rates with respect to time, the transmission transmits power at various demands. This rotational power transmission entity consists of two parametric components in multiplicative relationship. These components are torque and angular velocity. The primary function of any automotive transmission should be defined as the optimum apportionment of these two components accompanied by a minimum of power friction losses. The apportioning of these two components, or their ratio mix, must be responsive to the immediate load demand and power source capabilities in order to achieve an optimum state of function. All present day automotive transmissions, whether automatic or manual, fall short of such optimum performance values because of being limited in this apportionment capability both with respect to the ratio range and to the finiteness of the ratios provided. In those transmissions where the available ratios are the greatest, while being severly limited in apportionment range—namely automatic transmissions—the efficiency of power transmission is, almost without exception, the worst due to fluid friction losses.

The utilization of angular momentum in this transmission for the purpose of overcoming such inefficiencies of frictional losses, as found in present day transmissions, can best be understood by a general discussion relating to angular momentum. A frequently cited example of momentum conservation is that of a skater pirouetting on one skate tip who, upon decreasing his moment of inertia I by bringing his arms to his sides, increases his angular velocity $\omega$. Not so familiar is the consideration of the frictional effect between the skate tip and the ice surface during the pirouetting movement. Because of this opposing torsional stress M, the skater's angular momentum L is not completely conserved, but is nearly so, during the short time interval of arm lowering. For simplicity, windage losses are neglected. Because of the angular momentum L not being totally conserved, due to the presence of the torsional stress M, this transferring of angular momentum L to the ice results in an infinitesimal change in the angular velocity of the earth's mass. The angular momentum loss, $\Delta L$, by way of torsional stress transference from one momentum system to another, then causes the cited momentum conservation to be only partially applicable to the skater. Torque arises from the time-rate-of-change of angular momentum L. $M=I d\omega/d\tau = d(I\omega)/d\tau = dL/d\tau$ or, the resultant external torque equals the rate-of-change of angular momentum. Consequently $Md\tau=dL$ which, when integrated over a time interval, e.g., from $\tau_1$ to $\tau_2$, results in an angular impulse of torque equal to a change in angular momentum as follows:

$$\int_{\tau_1}^{\tau_2} \Sigma M d\tau = \int_{L_1}^{L_2} dL = L_2 - L_1$$

Thus, the greater the skate's torque M against the ice the lesser is the increase of the skater's angular velocity $\omega$ for a given reduction of the skater's moment of inertia I. From this it is understood that, in the spirit of the present invention, a reduction of the moment of inertia I can result in both an increase in angular velocity $\omega$ and in torque M, the magnitudes of both angular velocity $\omega$ and torque M bearing an inverse relationship of I where angular momentum L is present.

An even lesser appreciated aspect of momentum conservation is that momentum is transferred from one mass system to another by any stress vector entity interacting between them. For example, there can be six degrees of stress vectors as there can be six degrees of motion vectors. These degrees are in addition to compound applications of the stress vectors. Such stress vector forces arise from physical contact between bodies or from action-at-a-distance forces such as those which arise from gravitational and electromagnetic fields. In completing this general discussion of angular momentum conservation, it is then understood that, if the pirouetting skater raises his arms, the moment of inertia I will be increased resulting in a reduction of the skater's angular velocity ω. But if additional angular momentum L is introduced to the skater's body concomitantly as his moment of Inertia I is increased, for example through torque application by means of a shaft attached to a helmet top which, in turn, is strapped to the skater's head, then this angular velocity ω can be lessened in its reduction, held constant, or actually increased in value dependent upon the torque and power characteristics of the power source.

With respect to the structure of the present invention, a transmission unit is provided including a number of movable inertial masses which cyclically change their radii-of-gyration from maximum-to-minimum and from minimum-to-maximum values relative to a reference axis of rotation. This transmission unit is coupled to a rotatable output shaft. If this shaft is stationary—as the movable inertial masses transit through their half-cycle of changing from their maximum radii-of-gyration to their minimum, e.g., as the brake on a vehicle is released and the accelerator depressed in automotive application during vehicular start-up—a maximum torque is exerted on the rotatable but initially stationary output shaft. That it is possible for the movable inertial masses to continuously orbit or travel about a reference point so as to cyclically traverse from positions of maximum-to-minimum-to-maximum radii-of-gyration, while the rotatable output shaft experiences torque impulses therefrom, as its angular velocity remains zero, such a kinematic linkage interaction is one of the novel features of this invention. Consequently, a change in torque and/or angular velocity is applied to the output shaft, depending upon the characteristics of the load coupled to the transmission unit. Torque and angular velocity are inversely and linearly related such that they are automatically proportioned or "rationed" in an infinite step or manner to provide optimum torque and angular velocity to the output shaft dependent upon the load. The magnitudes of such apportionment components, of course, also reflect the power characteristics of the power unit to which the transmission's input shaft is coupled.

Although various coupling mechanisms have been devised relating to the coupling of energy from a driving source to a driven source, these coupling mechanisms do not automatically and infinitely convert angular velocity to torque and torque to angular velocity using the angular momentum of dynamic solid masses present within the system. Rather, much of the prior art devices are limited to slip clutch arrangements which are not torque converters. Other prior art mechanisms are transmission devices which do include masses for undergoing a radius of gyration change. However, these mechanisms utilize centrifugal and frictional forces for operation, unlike the present invention which minimizes friction losses and utilizes the conservation of angular momentum for apportioning the necessary torques and angular velocities but not centrifugal forces thereof. In this regard, unlike the present invention wherein inertial masses are continuously oscillated to provide a cyclic radius-of-gyration change, prior known devices include non-continuously oscillating masses to effect fixed step changes between angular velocity and torque.

PRIOR ART STATEMENT

The following patents are submitted in accordance with the provisions of 37 C.F.R. 1.97-1.99 and are believed to represent the closest prior art:

British Patent Application No. 930004 to Cicin describes a transmission including a pair of carriers or gear units linked together by a differential transmission unit. Centrifugal weights are rotatably attached to the gear units. The linked carriers are intended to provide a varying torque depending upon the output load acting on a driven shaft.

U.S. Pat. No. 4,195,721 to Shea discloses a torque exchange coupling comprising an input shaft attached to a rotor. Riders are pivotally and extendably mounted on the rotor for contacting a track. The interior cam surface of the track is undulant. The rider, or cam follower, can be modified to include a roller to facilitate movement about the track. The input shaft is connected to a motor while the output shaft is connectable to a resistant rotatable object. The operation of the coupling is described in three stages. In the first stage, the rider arms move upon the track by centrifugal force and with some tendency to produce rotation of the housing. In the second stage, the rider arms move upon the track at greater speed and exert enough centrifugal, sliding frictional force against a track to produce some rotation of the housing but at a rate of rotation less than that of the input shaft. In the third stage, as a result of the speed of rotation of the housing reaching the speed of rotation of the rotor, centrifugal, and frictional forces applied by the rider arms to the track cause the housing and rotor assembly to become locked and turn integrally.

U.S. Pat. No. 2,091,211 to Mattia describes a mechanism for use when a driven shaft revolves at a greater speed than a power shaft. A one way clutch is located between the driven shaft and planetary wheels for connecting a planetary wheel to the power shaft when the driven shaft revolves at a greater speed than the power shaft.

U.S. Pat. No. 2,290,293 to Porter describes a transmission having eccentrically weighted planets. The transmission is characterized by the action of a torque acting on a driven shaft through a number of clutches. When the speed of the driven shaft matches the input shaft, the driven shaft rotates through a single clutch.

U.S. Pat. No. 1,721,432 discloses a transmission unit having eccentrically mounted weights for using centrifugal forces to change the output torque on a load. Two such transmission units may be joined serially.

U.S. Pat. No. 2,984,124 discloses a variable slip clutch mechanism rather than a torque converting transmission. A sun gear is secured to an output shaft. Planet gears are secured to an input shaft and engage the sun gear. Crank arms are connected to the planet gears. Masses are operatively and pivotally connected to the crank arms.

SUMMARY OF THE INVENTION

In accordance with the present invention, an inertial transmission unit is provided for converting torque to angular velocity and angular velocity to torque in an infinite-ratio manner using the rotational kinetic energy, via its intrinsic angular momentum, contained therein, in a manner dependent upon the load characteristics with which the inertial transmission is operatively joined. In one embodiment, a transmission unit is provided which includes inertial masses movable along a spherical path. The movement of the inertial masses towards and away from a reference axis causes a cyclical change in the radius-of-gyration of the inertial masses. The transmission unit may be coupled to an input shaft and an output shaft by means of one-way clutches which can improve transmission in one desired direction. During operation the input or driving shaft is rotated by a power source. The input shaft is coupled to the transmission unit by one of the one-way clutches. The transmission unit includes a rotor chassis and a pair of counterrotatable rotors having balanced, opposing, inertial masses connected thereto at the ends of the rotors. The coupling of a powered input shaft causes the rotor chassis and rotors to rotate about a primary axis while both rotors also simultaneously rotate about a rotor axis. Preferably, the primary axis and rotor axis are mutually orthogonal and the inertial masses move along spherical paths during their rotation. During any cyclical radius-of-gyration change in the inertial masses, the moment of inertia of the masses cyclically changes, thereby transmitting angular momentum to the output shaft in the form of torque and/or angular velocity as the radius-of-gyration and the moment of inertia concomitantly reduce, the magnitudes of which depend upon the load characteristics applied to the output shaft. And, if there is no load, the angular momentum is conserved within the rotor chassis subassembly, windage and friction losses neglected. No load implies no useful torque. Conversely, if the output shaft remains stationary, angular momentum is maximally transmitted to the output shaft and there is no angular velocity since maximum torque acts on the output shaft as a consequence of the momentum transfer. Hence, no power transfer occurs. Generally, the greater the output load to be overcome, the greater the magnitude of torque provided. The flow of angular momentum through the transmission unit depends upon the rotation of the rotors and inertial masses. Whenever the rotors and inertial masses are moving away from the primary axis, angular momentum and rotation kinetic energy flow from the power source to the rotor chassis subassembly. Whenever the rotors and inertial masses move towards the primary axis, there can be an action of partial reverse flow of momentum and energy back to the power source from the rotor chassis. The one-way clutch coupled between the input shaft and the transmission unit is provided to prevent this unwanted flow reversal of angular momentum in a direction from the output shaft to the input shaft and power source. Other functional mechanisms can be substituted for the one-way clutch. By way of example only, the resilient coupling can be operatively provided between the rotor chassis subassembly and the input shaft, although it is not necessarily restricted to this linkage location since it can function anywhere between the inertial masses of the inertial mass links and the input shaft. In this latter instance, where two counterrotating inertial masses are utilized, two resilient couplings are respectively incorporated within the two inertial links. Rather than each inertial link possessing but one shaft element, two shaft segments—of a common axis—would be joined by a resilient coupling. It is often desirable that the couplings experience connecting mass structure with the inertial masses of minimum inertial moments. Irrespective of actual structure, any mechanism which prevents the flow of angular momentum from the rotor chassis subassembly to the input shaft can be used.

In another embodiment, a number of transmission units are in operative association with each other such that no reverse flow of angular momentum to the power source occurs. Preferably, the transmission units are in a balanced phase relation with respect to the changing of the radii-of-gyration of their inertial masses in order to maximize the efficient transmission of angular momentum in the form of torque and angular velocity to the output shaft. A forward drive gear is coupled to the output shaft. A number of gears, corresponding to the number of transmission units utilized, interconnect the transmission units to the forward drive gear or rear driven gear. The balanced phase relation between the transmission units results in radius of gyration changes in one unit different than that of the other transmission units. The balanced phase relation is maintained so that a combining of the radius-of-gyration changes in the plurality of transmission units generates a "gliding inertial wave" wherein, at any instance of time, angular momentum is not directed or caused to flow towards the power source. It has been determined that the optimum number of phases is three based upon hardware investment versus effective power transmission, with 120° balanced phases a requisite. In this manner, the one-way clutch between the input shaft and the rotor chassis subassembly is unnecessary since there is no angular momentum flow to the power source.

In view of the foregoing description, a number of advantages of the present invention are readily seen and a number of worthwhile objectives thereof are achieved. An efficient transmission unit is provided for automatically, in a stepless fashion, transforming torque to angular velocity and angular velocity to torque using the principle of angular momentum conservation. The apportioning of torque and angular velocity depends upon the load conditions to which the transmission unit is coupled. The invention includes inertial masses which change their radii-of-gyration to effect a change in angular velocity and/or torque. The inertial masses travel about a spherical or three-dimensional path, unlike known structures which utilize mass elements for moving in single planes for other purposes, so that a greater ratio of change between the maximum radius of gyration and the minimum radius of gyration occurs. As a result, a more efficient transmission of torque and/or angular velocity is provided to an output load.

Further transmission efficiency is attained by a torque-unifying feature of this invention. The cyclic frequency of radius-of-gyration change is proportional to the difference in the angular velocities of the respective input and output shafts. As the vehicle continues to accelerate from a start-up condition, the differences in these angular velocities typically diminish. A steady-state condition of zero angular velocity difference, a one-to-one drive, is considered highly desirable as regards efficiency of a transmission since a varying ratio involves increased frictional losses. As the input and output torques approach equality, the counterrotatable inertial masses seek to achieve states of respective maximum radius-of-gyration positions because these particular positions constitute their lowest energy states with respect to the inherent radial accelerations. If, while in this one-to-one drive state, a sudden torque impulse is applied to the input shaft (engine power surge) this shaft's angular acceleration can suddenly exceed that of the output shaft, thus causing an increased torque to act on the output shaft as the one-to-one drive mode is broken free of. This action is, in effect, equivalent to down-shifting while accelerator-depressing in a normal transmission vehicle in order to accelerate while passing. Again, the performance will be superior with the subject transmission invention because of the infinite ratios of torque/angular velocity that come into play.

It is estimated that an approximately 20% increase in fuel efficiency will be realized for automotive application in contrast to the typical automotive transmission. The transmission unit of the present invention has particular utility as a replacement for the conventional transmission and differential used in a vehicle. Additionally, its application can be multifold rather than a simple transmission replacement. For example, two transmission units can be operatively joined on output sides of a right angle bevel gear drive located in the position normally—in substitution for the single transmission unit typically mounted to the engine block—occupied by the differential unit in order to provide an energy-efficient delivery of independent torque/speed values to each of two driven wheels while eliminating the differential unit in addition to thus providing a vastly superior power transmission to these drive wheels of a vehicle when contrasted with that typical condition, as exemplified by that undesirable situation of a near-torque-free spinning of one of these wheels, for example because of ice. This spinning does not eliminate torque application to the remaining drive wheel as presently occurs with conventional automotive drive trains. Also, four of the transmission units of the present invention, in conjunction with two right-angle bevel gear drive units, could be incorporated in a "four-wheel" drive vehicle so as to provide the unique, infinitely-variable, torque/angular velocity characteristics of this drive individually to each of the wheels where traction will then be optimized at each wheel. This drive is clearly superior to existing "four-wheel" drives.

Additional advantages of the present invention will become readily apparent from the following discussion taken in conjunction with the accompanying drawings.

BRIEF DESCRIPTION OF THE DRAWINGS

FIG. 1 is a schematic longitudinal section of the transmission unit of the present invention;

FIG. 2 is a schematic lateral section, taken along lines 2—2 of FIG. 1, illustrating the rotational movement of the transmission unit of FIG. 1;

FIG. 3 is a schematic longitudinal section illustrating movement of the rotors within planes at 90° with respect to those of FIG. 1;

FIG. 4 is a schematic lateral section, taken along lines 4—4 of FIG. 3, also illustrating a 90° movement of the rotors with respect to FIG. 1;

FIGS. 5A–5F show various rotor designs illustrating different radius-of-gyration ratios;

FIGS. 6A–6I show another embodiment illustrating a pair of counterrotating rotors in which one rotor rotates within the other rotor;

FIGS. 7A–7C show still another rotor embodiment in which a pair of counterrotating rotors are identical in form;

FIGS. 8A–8B show still yet another embodiment of a rotor configuration in which a single rotor is utilized;

FIG. 9 is a schematic side elevational view of a second embodiment of the transmission unit of the present invention showing one component transmission unit of a compound transmission unit;

FIG. 10 is a schematic lateral section of the compound transmission unit illustrating the interconnection of the three component transmission units;

FIG. 11 is a schematic longitudinal section, taken along lines 11—11 of FIG. 10, of the compound transmission unit showing the interconnection of the three component transmission units;

FIG. 12 is a schematic rear elevational view of the compound transmission unit;

FIG. 13 is a schematic longitudinal section of a third embodiment of the present invention illustrating an "inside-out" version of the transmission unit;

FIG. 14 is a schematic top plan view of the third embodiment of the present invention illustrating movement of one of the rotors;

FIG. 15 is a longitudinal section of a fourth embodiment of the present invention schematically illustrating a crank-link embodiment;

FIG. 16 is a lateral section, taken along lines 16—16 of FIG. 15, further schematically illustrating the crank-link transmission unit of the fourth embodiment;

FIG. 17 is a representation of link displacement of the crank-link transmission unit configuration of FIGS. 14 and 15;

FIG. 18 is a schematic longitudinal section of a fifth embodiment of the present invention illustrating a crank-link configuration using multiple mass units; and FIG. 19 is a schematic lateral section, taken along lines 19—19 of FIG. 18, illustrating further details of the embodiment of FIG. 18.

DESCRIPTION OF THE PREFERRED EMBODIMENTS

In accordance with the present invention, a transmission unit 20 is provided and depicted in FIGS. 1 through 4. An input or driving shaft 22 is connected to one side of the transmission unit 20 while an output or driven shaft 24 is connected to an opposite side thereof. A source of power (not shown) is adapted to be coupled to the input shaft 22 for rotating the input shaft 22 about a primary or reference axis P—P. A load is adapted to be coupled to the output shaft 24 and may include various configurations to be driven, including the wheels of a vehicle.

Typically, the transmission unit 20 applies the power provided to the input shaft 22 to the output shaft 24 in the form of torque and angular velocity, depending upon the load conditions then existing on the output shaft 24. The torque and angular velocity are provided to the output shaft 24 using the angular momentum present in the transmission unit 20, so as to govern the apportionment of these two power components, as a result of the power applied to the transmission unit 20 and the cyclic radius of gyration changes of rotors having inertial masses, which form an essential part of the present invention.

The transmission unit 20 includes a forward clutch housing 26, a forward transmission housing 28, a rear transmission housing 30, and a reverse clutch housing 32. The forward clutch housing 26 and forward transmission housing 28 are integrally joined together while the rear transmission housing 30 and rear clutch housing 32 are integrally joined together. The forward transmission housing 28 and rear transmission housing 30 are fixedly fastened together by means of a number of dowel pins 34. The dowel pins 34 are press-fitted into holes formed in the forward transmission housing 28 and rear transmission housing 30 along the peripheries thereof in equally spaced relation. The dowel pins 34 are restrained from being inadvertently removed from their respective holes, by means of centrifugal forces, for example, by an internal retaining ring 36. A housing seal 38, which is typically an O-ring, and shaft seal 40, which may, in part, be an oil-saturated felt washer or an oil resistant/plastic seal, constitute, in conjunction with the input shaft 22, forward clutch housing 26, forward transmission housing 28, rear transmission housing 30, and reverse clutch housing 32, output clutch housing 42, and the output shaft 24, an environmentally protected apparatus.

The output shaft 24 is integrally joined to an output clutch housing 42. The output clutch housing 42 or link is attached for unidirectional rotational movement to the reverse clutch housing 32 by means of the bearing-/cam assembly reverse one-way clutch 44. A bevel ring gear 46 is secured to a ring support member 48 by means of a number of dowel pins 50. The dowel pins 50 are press-fitted into the bevel ring gear 46 and ring gear support member 48 along the peripheries thereof in an equally spaced manner so as to mutually engage them in a locking fashion. These dowel pins 50 are restrained from being inadvertently expelled from their respective holes, by centrifugal forces for example, by internal retaining rings 52. A rear shaft 54, in combination with the ring gear support member 48, form an integral member or, when viewed in attachment with the bevel ring gear 46, as a link entity. This link entity is rotationally attached to the output clutch housing 42 at an end of the rear shaft 54 by means of a bearing/cam assembly output one-way clutch 56.

A rotor chassis 58 is rotatably attached to the forward clutch housing 26 by means of a bearing/cam assembly or input one-way clutch 60 and through a chassis forward shaft 61 integrally joined to the rotor chassis 58 such that the axis of rotation of the rotor chassis 58 and the chassis forward shaft 61 is about the primary axis P—P and therefore common with the axis of rotation of the input shaft 22 and the output shaft 24. A chassis support shaft 62 is also integrally joined to the rotor chassis 58. The chassis support shaft 62 is rotatably attached to the ring gear support member 48 by means of an intervening, concentrically oriented bearing 64. The axis of rotation of the chassis support shaft 62 is also about the primary axis P—P.

The rotor chassis 58 includes four chassis flange stiffening webs 66, although the rotor chassis 58 need not include such structural details. Rotor chassis 58 supports one or more shafts. Each shaft is rotatable about a rotor axis R—R. Each of the rotor axes R—R is oriented at right angles to the primary axis P—P, as well as being caused to lie in a common plane of axis intersection. A pair of such shafts is provided in this embodiment. These shafts are identified as pinion shafts 68, 70. At ends of each shaft 68, 70, pinion-type bevel gears 72, 74, respectively, are provided. These pinion gears 72, 74 may assume different configurations; such extreme examples can be that of either a hypoid or of a skew bevel gear. This type of gear requires an offset of the longitudinal axes of the pinion shafts 68, 70 with respect to one another as well as with respect to the primary axes P—P such that these axes lie in three different but not necessarily parallel planes. However, the gear type must be of such a design that it is capable of being paired or operatively connected with the mating bevel ring gear 46. These bevel pinion gears 72, 74 are depicted as being integral with their associated shafts 68, 70, respectively. The particular type of bevel pinion gear 72, 74 is shown as a straight bevel gear.

Located at the opposite end of each pinion shaft 72, 74 is a portion identified as a shaft tapered end 76, 78. These tapered ends are of the locking taper variety. Those shown are of the Morse class locking taper with an included angle of closely three degrees. The pinion shaft 68, the bevel pinion gear 72, and the shaft tapered end 76 form a single mechanical link unit. The pinion shaft 70, the bevel pinion gear 74, and the shaft tapered end 78 form another single mechanical link unit. Each of these two links is rotatably mounted to the rotor chassis 58 by means of pinion bearings 79, 80, respectively, as well as by means of gyration rotor bearings 84, 86, respectively.

Internal retaining ring fasteners 87, 88, in conjunction with external retaining ring fasteners 89, 90, axially affix the pinion shaft 68, the bevel pinion gear 72, the shaft tapered end 76, and the pinion shaft 70, the bevel pinion gear 74, and the shaft tapered end 78 to their respective locations within and to the common rotor chassis 58.

The transmission unit 20 further includes cyclically movable radius-of-gyration rotors 92, 94 having inertial masses 93, 95 and 96, 97, at their ends and which are schematically depicted in FIGS. 1, 2, 3 and 4. It is understood that many different configured rotors can be provided for use with the present invention. Various rotor configurations are illustrated in FIGS. 5A–5F, 6A–6I, 7A–7C and 8A–8B. These rotor designs will be subsequently discussed.

Referring once again to FIGS. 1–4, it is seen that the rotor 92 is rigidly affixed to the linked unit pinion shaft 68, bevel pinion gear 72, and shaft tapered end 76 because of the locking engagement of its tapered hole about the shaft tapered end 76. Similarly, rotor 94 is rigidly affixed to the linked unit pinion shaft 70, bevel pinion gear 74, and shaft tapered end 78 because of the locking engagement of its tapered hole about the shaft tapered end 78. For the particular embodiment as shown in FIGS. 1 through 4, pinion bearing 79 and gyration rotor bearing 84 are attached to the linked unit including pinion shaft 68, bevel pinion gear 72, and shaft tapered end 76 by means of the two external retaining rings 89. This assembly is inserted into the outer end of its location cavity within the rotor chassis 58 with the rotor 92 previously having been aligned within the rotor chassis 58 so that the tapered joint will be affixed to provide a complete rotor link involving pinion shaft 68, bevel pinion gear 72, shaft tapered end 76, and rotor 92. This same assembly procedure applies for the linked unit of pinion shaft 70. Pinion bearing 80 and gyration rotor bearing 86 are attached to the linked unit including pinion shaft 70, bevel pinion gear 74 and shaft tapered end 78 by means of the two external retaining rings 90. This assembly is inserted into the outer end of its location cavity—opposite to that of the other linked unit—within the rotor chassis 58 with the rotor 94 previously having been aligned within the rotor chassis 58 so that the tapered joint will be affixed so as to provide a complete rotor link involving pinion shaft 70, bevel pinion gear 74, shaft tapered end 78, and rotor 94. This latter assembly procedure differs in that the final seating of the shaft tapered end 78 within the rotor 94, with respect to angular relation, is also effected with a special jig fixture. This assures a proper phase relation of rotors 92, 94 with respect to the engagement of the bevel pinion gears 72, 74 with the bevel ring gear 46 as schematically depicted in FIGS. 1–4 such that the longitudinal portions of rotors 92, 94, for example, lie in a plane common with the axis P—P as one of their many possible orientations.

Consequently, the foregoing assembly procedure assures that the longitudinal axis of the rotors 92, 94 will lie in a plane common with the primary axis P—P twice for every rotational cycle of the rotors 92, 94. After such an alignment has been achieved and while the assembly is rigidly secured within its assembly alignment fixture, two holes are bored, reamed, pinned and retaining-ring grooved at 98, 99, as illustrated in FIGS. 3 and 4, such that the press fit insertion of dowel pin units into these holes are held by two sets of internal retaining rings inserted within these grooves.

The rotor chassis 58 is further assembled by keying the input one-way clutch 60 onto the chassis forward shaft 61 by initially inserting a key into the forward shaft keyway 100 and then securing the assembly using a lock washer, washer and hex lock nut, as illustrated in FIG. 1. The chassis support shaft 62 has its bearing 64 secured by means of an external retaining ring 102.

Bevel ring gear 46 is joined to the ring gear support member 48 by means of the dowel pins 50 and internal retaining rings 52 in a manner identical to that utilized in affixing the forward transmission housing 28 to the rear transmission housing 30, as previously discussed. A linked unit consisting of bevel ring gear 46, ring gear support member 48 and rear shaft 54 is then assembled to the rotor chassis 58 by means of inserting the protuberant chassis support shaft 62 with its bearing 64 locked on by the external retaining ring 102 into the concavity of the ring gear support member 48 as apparent from FIG. 1. An internal retaining ring 103 is loosely hung on the neck connecting the chassis support shaft 62 to the ring gear support member 48 by means of bearing 64 which is seated within this apex bearing cavity of the conical ring gear support member 48. The internal retaining ring 103 is then positioned in its locking groove, as schematically depicted in FIG. 1, thereby locking these two sub-assemblies together so as to form a larger sub-assembly including bevel ring gear 46, ring gear support member 48, bevel pinion gear 72, bevel pinion gear 74, pinion shaft 68, pinion shaft 70, shaft tapered ends 76, 78, rotors 92, 94, rotor chassis 58, chassis forward shaft 61, chassis support shaft 62, input one-way clutch 60, and rear shaft 54. Internal retaining ring pliers are available for inserting ring 103 into its groove. The output one-way clutch 56 is then placed over or about the rear shaft 54 with a key being previously inserted in a rear shaft keyway 104. This output one-way clutch 56 is then completely secured to the sub-assembly by attachment of the external retaining ring 91, as shown in FIG. 1. The next step of assembly is preferably that of placing output clutch housing 42 and the integrally joined output shaft 24, about the output one-way clutch 56, with the output housing key 108 having first been inserted. Permitting gravity to hold this stage of the assembly together while vertically maintaining the input shaft 22, the forward clutch housing 26, and the forward transmission housing 28 such that the input shaft 22 points downwardly, the input one-way clutch 60 is slid into the forward clutch housing 26 with a forward housing key 110 having first been placed in position. The reverse one-way clutch 44 is then lowered into its keyed position about the output clutch housing 42. The rear transmission housing 30 and the integrally-joined reverse clutch housing 32 are then lowered into assembled position with the reverse housing key 112 and the reverse drive key 114 having been previously inserted so that the output shaft 24 and the output clutch housing 42 are rotatably affixed thereto. In order to complete the assembly of the transmission unit 20, lubricants are added, the shaft seal 40 is press-fitted into position and the housing seal 38 is positioned so as to be seated between the two housing halves as they are affixed together by means of the dowel pins 50 and the internal retaining rings 52, as previously described.

A functional explanation of the transmission unit 20 is now provided. Rotation is applied to the input shaft 22 in the rotational direction depicted by the arrow or vector 118 having a forward rotation designation as depicted in FIG. 1. The input shaft 22, forward clutch housing 26, forward transmission housing 28, rear transmission housing 30, and the reverse clutch housing 32 function as a single unit or link. This housing structure always rotates as one when the input shaft 22 is rotated. The input one-way clutch 60 is so installed that it will deliver identical rotation to the chassis forward shaft 61 as is experienced by the input shaft 22 only when the input shaft 22 is rotating in that sense depicted by the forward rotation vector 118. If that portion of the input one-way clutch 60, which is keyed to the forward clutch housing 26, were to be driven in a rotational direction counter to the vector 118, no torque, other than minimal friction drag, would be transmitted to that portion of the input one-way clutch 60 keyed to the chassis forward shaft 61. This selectivity of rotational drive sense, or property of freewheeling, describes not only the characteristics of the input one-way clutch 60 but also those of the output one-way clutch 56 as well as the reverse one-way clutch 44. Such a one-way clutch can also be evaluated for its torque drag, when freewheeling, for its locking torque limit, for its unlocking torque and for its backlash, among other performance specifications. As an example, a one-way clutch can have a backlash value of less than fifteen arc minutes which is a reversal characteristic far less than needed to meet the pertinent functional needs when so utilized in the present invention.

Thus, if the input shaft 22 is subjected to a 1200 revolutions per minute (rpm) rotational rate, a rotational direction defined by the vector 118, the forward clutch housing 26, forward transmission housing 28, rear transmission housing 30, reverse clutch housing 32, input one-way clutch 60, chassis forward shaft 61, rotor chassis 58, and chassis support shaft 62 also rotate at 1200 rpm in the same directional sense. For a better understanding of the workings of the transmission unit 20, assume that the output shaft 24 is prevented from rotating while the input shaft 22 is rotating at 1200 rpm. Consequently, the bevel ring gear 46 and the ring gear support member 48 are locked from rotating in the direction defined by the vector 118 because of the manner of installation of the output one-way clutch 56. In this example the bevel ring gear 46 will be assigned involute-configured teeth of 20° pressure angle, straight bevel, 8 pitch, 12.750 inches pitch diameter and one hundred two (102) teeth. The bevel pinion gears 72, 74 will both be design-matched to the bevel ring gear 46 and each will possess twelve (12) teeth thereby requiring 1.500 inch pitch diameters. With the input shaft 22 rotating at the rate of 1200 rpm in the direction defined by the vector 118, the rotor chassis 58 will then experience a like rotation rate, which may be expressed as rotating at 20 revolutions per second (rps). A ratio of 8.5 to 1 exists between the bevel ring gear 46 and the two bevel pinion gears 72, 74 respectively. The schematic representation of FIG. 3 illustrates the 90° rotation of the input shaft 22 with respect to the illustration of the transmission unit 20 in FIG. 1. There is thus a difference of 12.5 milliseconds existent between FIG. 1 and FIG. 3.

The two cyclic radius-of-gyration rotors 92, 94 will rotate about their respective rotor axes R—R. Rotor 94 rotates in a counterclockwise direction while rotor 92 rotates in a clockwise direction, both at 170 rps as viewed from FIG. 3. The two counter-rotating-rotors 92, 94 will experience their greatest relative separation angularly from one another while momentarily existing within the plane of the drawing illustrated in FIG. 3, after rotation of the input shaft 22 by 90° (assuming the rotors 92, 94 are positioned initially as shown in FIG. 1). Each rotor 92, 94 will have rotated 765° one counter to the other or 1530° relatively, such that they bear a 90° relation to one another and a 45° relation to the primary axis P—P rotation of the transmission unit 20. This 90° rotor relation is represented in FIG. 3. Thrs preceding description of exactitudes of link motion and displacement is for clarity of schematic presentation of FIG. 1 with respect to FIG. 3 as well as vice versa. FIG. 1 depicts the two rotors 92, 94 with a 180° relationship with respect to each other and a 0° relationship with respect to the transmission unit's primary axis P—P and, consequently, FIG. 1 illustrates a 90° retarded phase relation with respect to the rotational displacement of the input shaft 22 illustrated in FIG. 3. The phase relation change between FIGS. 1 and 3 with respect to the output shaft 24 is 0° due to its "locked" condition. It is readily comprehended, upon familiarizing oneself with the kinematics of the transmission unit 20 that rotors 92, 94 will align with each other as they align with the primary axis P—P and will again align with each other when they are at right angles with respect to the primary axis P—P.

Proper operation of the inertial transmission unit 20 depends upon the continuing cyclic rate of change of the radii-of-gyration, from maximum to minimum to maximum values—one extreme ever following the other—of the inertial masses 96, 97 and 93, 95 of the counter-rotating rotors 92, 94, respectively. This operating feature can be explained with reference to the action of a pirouetting skater. Specifically, when a pirouetting skater lowers her arms from an outspread horizontal position to her side, she will be reducing her moment of inertia I. The angular momentum L content of her body, combined with the reduction in the moment of inertia I, causes an increased torque M and an increased angular velocity to act on her body. An increased torque M is a measure of an increased flow of angular momentum L from the skater's body to the earth through the ice because of friction. The rotational kinetic energy K of the skater's body is also transmitted to the earth by means of the torque interaction between the pirouetting skater's skate point and the ice surface and can be mathematically expressed as $K = \frac{1}{2}I\omega^2$. A portion of the kinetic energy is not conserved, rather, it is transformed into thermal energy because of this contact friction existent between the skate and ice. The time rate-of-change of the kinetic energy transfer is a measure of the effective power P and is defined by the product relationship existent between the torque M and angular velocity $\omega$ transfer. Extending this example further and assuming that the skater now is a four-armed deity, the present invention can more aptly be compared therewith. Specifically, the skater's upper right arm and lower left arm correspond to the rotor 92 while the skater's upper left arm and lower right arm correspond to rotor 94. In operation, the skater would synchronously lower her upper two arms from overhead to horizontal positions while, concomitantly and synchronously, raising her two lower arms from her sides to their horizontal positions, this action thereby appreciatively increasing her moment of inertia.

Referring again to the structure of the present invention, if the moments of inertia of the inertial masses 93, 95, with respect to axis P—P, are cyclically and continuously changed from a maximum value to a minimum value and back again, an alternating flow of angular momentum, kinetic energy, and power are experienced within the transmission unit 20. The determination of the magnitude of these changing parameters at any instance of time is complex. The radius-of-gyration changes of the inertial masses 96, 97 and 93, 95 of the rotors 92, 94 about the axis P—P and the frequency of change thereof must be analyzed in order to determine the magnitude of these parameters. In this regard, at any one moment, the rotors 92, 94 are rotating in three-dimensional space. As a consequence, rotors 92 and 94 rotate about varying polar vector components which can best be defined using three mutually orthogonal axes of the rotors 92, 94 themselves with reference to inertial space.

In order to better understand the transmission or flow of power, kinetic energy, and angular momentum through the transmission unit 20, a simplified example is provided of such flow through a horizontal rotating shaft. Initially, the direction of flow through the horizontal shaft must be analyzed. Within a horizontal shaft the flow of angular momentum, power, and kinetic energy may be presumed to be in one of two directions. As earlier discussed, the multiplicative interaction between torque M and angular velocity $\omega$, including a constant for conventional values of torque and angular velocity, provides the power P being transmitted through a shaft. The direction of rotation of the horizontal shaft however does not measure the direction of flow of angular momentum, kinetic energy, and power through the shaft. The torque present within the horizontal shaft causes a torsional strain measurable by the relative angular deflection existent between the shaft ends. The resulting rotational strain or angular displacement between the two shaft ends, due to the applied torsional stress, combined with the rotational sense, e.g. CW or CCW, provide the information for determining which direction, within the rotating shaft itself, the flow of angular momentum, power and kinetic energy occurs.

If it is assumed that the shaft, as viewed from its left-hand end, rotates clockwise, then the driving torque applied to the shaft's left-hand end is in a clockwise direction. A counterclockwise torque relative displacement is present at the right-hand end of the horizontal rotating shaft still as viewed from the left-hand end due, e.g., to power transmission. Power, kinetic energy, and angular momentum are then flowing from left to right and a strain gauge with a slip ring interconnection will provide the direction of flow information. The power flow vector will reverse itself, however, if the torque at the shaft's right-hand end becomes clockwise, still as viewed from the left-hand end, with respect to the angular orientation of the shaft's left end. The relatively less torque, now existent at the left-hand end of the shaft, consequently must become counterclockwise in sense. The shaft continues rotating in the same clockwise direction as before even though the power flow vector has reversed itself. This flow can reverse itself, or travel in the forward direction also when the shaft reverses its rotation, but a power source generally will not permit a reversal of its output shaft. Examples of such nonreversal is found in the conventional automobile engines. If the forward direction of the automobile causes a clockwise rotation of the drive shaft, then this same direction of rotation will be maintained when the engine is powering the vehicle, e.g., when the car is moving uphill or when the engine is acting as a brake, e.g., when the automobile is moving downhill. In the former, the flow is from the engine to the wheels through the drive shaft. In the latter, the flow is from the wheels to the engine, although the drive shaft must rotate in the same clockwise direction since the automobile continues to move forward in direction.

This flow information, pertinent to angular momentum as well as to power and kinetic energy, can now be applied to the transmission unit 20. For certain conditions of input torque and input angular velocity, as related to output torque and output angular velocity, a reversal of flow of angular momentum in cyclic impulses as well as power and kinetic energy, can occur between the power source and the input shaft 22. As the rotors 92, 94 respectively rotate 90°, when measured from the rotor chassis 58 about their respective rotor R—R axes, so as to travel from a condition of minimum radii-of-gyration to maximum radii-of-gyration with respect to the P—P axis, a torque impulse acts on the input shaft 22 which causes an impulse of angular momentum to flow from the power source to the rotor chassis 58 since the rotor chassis 58, if free-wheeling, would tend to decelerate due to the increased moment of inertia I resulting from the radii-of-gyration changes. Because of this angular momentum pumping action of the transmission unit 20, the next half cycle of the rotors 92, 94 results in the generating of a torque impulse which acts on the rotor chassis 58 about its P—P axis in the same rotational sense as its existent angular velocity. Consequently, the flow of angular momentum reverses for a fractional portion of the half-cycle flow so that some backflow can exist from the transmission unit 20 to the power source through the input shaft. In this time increment, the counterclockwise driven torque of the input shaft 22 can reverse to become a clockwise driving torque providing the ratio of the power source and drive train rotational links' inertial moments to the power source's inertial moments is within a certain range. The torque characteristics are then insufficient for maintaining an uninterrupted driving torque application against this additive torque impulse. Under these circumstances the transmission unit 20 suffers a loss in its effectiveness. In order to prevent this cyclic flow reversal, it is preferable but not necessary that the input one-way clutch 60 be provided between the input shaft 22 and the rotor chassis 58. The torque impulses, then originating within the rotor chassis 58 subassembly so as to act on the rotor chassis 58 and forward shaft 61, cannot cause flow reversal of angular momentum, power and kinetic energy back to the power source. In this manner, the driven shaft or chassis forward shaft 61 cannot act as a driving shaft unless the input shaft 22 rotation is reversed which, as previously pointed out, is not a consideration.

In another embodiment, a resilient coupling can be substituted for the one-way clutch 60. The resilient coupling itself is an element which is commonly incorporated in vehicular transmission clutch units and its structural make-up is not pertinent to the present invention. Its significance to the present invention lies in its combination with the rotor chassis 58 to prevent flow of angular momentum back to input shaft 22. The resilient coupling absorbs torque impulses originating in the rotor chassis 58. In so doing, this resilient coupling maintains a unit directional torque application, although time-variant, on the input side of the rotor chassis 58 because of low inertial moment values between the resilient coupling and the rotor chassis 58. Thus, reverse flow of momentum and energy to the power source is prevented. Additionally, it is also understood that the present invention is not limited by or to the use of a one-way clutch or a resilient coupling. Rather, any mechanism, such as a power source, or drive train, of proper torque and resiliency characteristics, which satisfactorily prevents reverse flow of momentum and energy to the power source, can be utilized.

As the rotors 92, 94 rotate through the next 90°, such that their longitudinal axes come into axial alignment with the primary axis P—P, the maximum radii-of-gyration reduce to the minimum radii-of-gyration. Torque impulses are generated on the ring gear support member 48 and the rear shaft 54 in the rotational direction represented by the vector 118. The torque impulses are produced by the lateral pressures of the teeth of bevel pinion gears 72, 74 engaging the bevel ring gear 46. Since the bevel pinion gears 72, 74 are already tracing about the bevel ring gear 46 because of the input shaft 22 having greater angular velocity than the rear shaft 54, there exists an essentially continuing side thrust between the teeth of the bevel pinion gears 72, 74 against those teeth of the bevel ring gear 46. The aforementioned torque impulses and these lateral thrusts are combined in a summing fashion to accelerate this 90° rotation while simultaneously pumping angular momentum, kinetic energy, and power into the ring gear support member 48 and rear shaft 54. The output one-way clutch 56 then transmits the angular momentum, as well as the kinetic energy and power, to the output shaft 24. The output shaft 24 transmits these parameters to the load which is coupled to the output shaft 24. Depending upon the torque and angular velocity requirements present because of the load, the torque impulses of the reducing radii-of-gyration apportions to provide both the necessary torque and angular velocity values optimally required by the load. It is this infinite apportioning of power into its torque and angular velocity components in accordance with the load demand characteristics, within the limits of the power source, that characterizes the effectiveness of the transmission unit 20.

The function of the output one-way clutch 56 is interrelated to the function of the input one-way clutch 60 under those operational modes where portions of reverse flow of angular momentum, kinetic energy and power would otherwise occur. Just as input one-way clutch 60 prevents the reverse driving of input shaft 22, output one-way clutch 56 prevents a driving of the rear shaft 54 by the output shaft 24 and thereby eliminates any partial flow of power, kinetic energy, and angular momentum from the output shaft 24 back through to the transmission unit 20. Additionally, it is again also to be understood that the present invention is not limited by or to the use of a one-way clutch in this manner. Rather, any mechanism which satisfactorily controls or prevents reverse flow of momentum and energy from the output shaft, so as to diminish the transmission's power pumping capacity, can be utilized. And there are special circumstances where it is desirable to reverse pump. momentum, energy and power backwards into the transmission since it thus acts as a partial brake combined with an energy storage function.

The function of the output one-way clutch 56 is interrelated to the function of the input one-way clutch 60 under those operational modes where reverse flow of angular momentum, kinetic energy and power would otherwise occur when unwanted. Just as input one-way clutch 60 prevents the reverse driving of input shaft 22, output one-way clutch 56 prevents a driving of the rear shaft 54 by the output shaft 24 and thereby eliminates any partial flow of power, kinetic energy, and angular momentum from the output shaft 24 back through to the transmission unit 20 where its effect would be the reduction of power pumping capacity.

When the transmission unit 20 is used as an automotive transmission, other structural features are included. To prevent the transmission unit 20 from entering a freewheeling mode, the reverse one-way clutch 44 has been provided. The output shaft 24 and the output clutch housing 42 will link with the assembly including the input shaft 22, the forward clutch housing 26, forward transmission housing 28, rear transmission housing 30, and reverse clutch housing 32 by means of the reverse one-way clutch 44 when the reverse flow of power, kinetic energy and angular momentum occur as the engine brakes the vehicle in its forward motion so as to impart negative acceleration.

The reverse one-way clutch 44 also serves to provide a reverse drive train for the backing of a vehicle. A reverse drive unit (not shown) can be provided between the power source and the input shaft 22. When in the reverse mode, the input shaft 22 will be caused to rotate in a direction opposite that shown by the vector 118. The input one-way clutch 60 will be in its freewheeling mode under this set of conditions. If this opposite rotation were to reach the rear shaft 54, it too would be uncoupled from the output shaft 24 because of the intervening output one-way clutch 56. The reverse drive train through the transmission unit 20 is then made up of the input shaft 22, forward clutch housing 26, forward transmission housing 28, rear transmission housing 30, reverse clutch housing 32, reverse one-way clutch 44, output clutch housing 42, and the output shaft 24. The hunting action of a vehicle in reverse gear, because of the large gear ratio, is also eliminated due to the one-way clutch 44 intervening in the oscillatory flow of power, kinetic energy and angular momentum within the drive train.

A further functional feature of the transmission unit 20 becomes apparent whenever the angular velocity of the output shaft 24 approaches the angular velocity of the input shaft 22. Particularly, a locking torque synchronizes the input and output speeds of the transmission unit 20. This locking torque is one of the inherent cyclic torque impulses which periodically manifest themselves as the inertial masses 93, 95, 96, 97 pass through their maximum radii-of-gyration positions. As the lesser angular velocity of the output shaft 24 approaches the angular velocity of the input shaft 22, these torque impulses lessen in their cyclic frequency. As the impulse rate approaches zero, the torque gains sufficient inertial predominance, with the frictional inherent damping forces present, that its force is able to lock the input shaft 22 and the output shaft 24 into synchronous relation because the inertial masses 93, 95, 96, 97 lock into their respective minimum energy positions of maximum radii-of-gyration. A steady-state condition of zero angular velocity difference, a one-to-one drive, is considered highly desirable as regards efficiency of transmissions since a varying ratio involves increased frictional or slippage losses. If, while in this one-to-one drive state, a sudden torque impulse is applied to the input shaft (engine power surge), this shaft's angular acceleration can suddenly exceed that of the output shaft's thus causing an increased torque to act on the output shaft as the one-to-one drive state is broken free of. This action is, in effect, equivalent to downshifting while accelerator-depressing in a manual transmission vehicle in order to accelerate while passing. Again, the performance will be superior with the subject transmission invention because of the infinite ratios of torque/angular velocity that come into play.

Before proceeding with a discussion of additional embodiments of the transmission unit 20 of the present invention, a description relating to the rotor configurations of FIGS. 5A–5F, 6A–6I, 7A–7C, and 8A–8B is provided. Initially, the operation of the pinion shafts 68, 70 is further amplified. If the output shaft 24 is in a locked state, the counterrotation angular velocity rates of pinion shafts 68, 70 about their longitudinal axes bear a fixed ratio with respect to the input angular velocity. If the output shaft angular velocity is identical to that of the input shaft angular velocity, the angular velocity rates of the pinion shafts 68, 70 about their longitudinal axes is zero. With both the input shaft angular velocity and the output shaft angular velocity at values greater than zero, and with the input shaft angular velocity of a greater magnitude than that of the angular velocity of the output shaft 24, the counterrotation angular velocities of pinion shafts 68, 70 about their longitudinal axes bear a fixed ratio with respect to the difference between the angular velocities of the input shaft 22 and the output shaft 24. This ratio is determined by the ratio existent between the numbers of teeth of the bevel ring gear 46 and those of the bevel pinions 72, 74.

Each rotor, whether it is a single rotor or a pair of counterrotating rotors, can be defined using three mutually orthogonal axes, namely, L—L, T—T, and E—E (see FIGS. 5A–5F). Generally, the L—L axis is parallel to the longitudinal plane of the rotor; the T—T axis is parallel to the lateral extent of the rotor; and the E—E axis is parallel to the width of the rotor. Each rotor L—L axis and each rotor T—T axis will twice align with the axis of the input shaft 22 and that of the output shaft 24 during each rotor rotational cycle. As a consequence of this rotational movement, each of the rotors L—L axis moment-of-inertia and T—T axis moment-of-inertia will sinusoidally interrelate with a frequency determined by the angular velocity present about the mutually orthogonally axis E—E. The maximum sinusoidal value briefly applies when rotation momentarily occurs solely about the T—T axis with respect to the L—L axis. Conversely, the minimum sinusoidal value briefly applies when rotation momentarily occurs solely about the L—L axis relative to the T—T axis. This sinusoidal alternation correlates in amplitude with the rotors designed maximum and minimum radii-of-gyration with reference to the L—L and the T—T axes, respectively.

With the foregoing operational explanation in mind, reference is made to FIGS. 5A–5F which illustrate different rotor embodiments for producing different locking torques (output shaft angular velocity = input shaft angular velocity). In addition, the previously designated axes L—L, T—T, and E—E are depicted in the figures. FIGS. 5A, 5B, 5C, 5D, 5E, 5F, depict both frontal and profile views of "bow-tie" configured rotors 120, 122, 124, in which rotor 120 respectively possesses lesser moments of inertia about each of its mutually orthogonal axes L—L, T—T and E—E than does, for example, rotor 122 which, in turn, as may be judged by inspection of FIGS. 5A through 5F, possesses yet lesser moments of inertia about each of its mutually orthogonal axes L—L, T—T and E—E than do those respective ones of rotor 124. The L—L axes are so located because the rotors 120, 122, 124 are used as one of a pair of counter-rotating rotors in which the axes of rotation for each pair of rotors is located therebetween.

As discussed, a locking torque of the pair of counter-rotating rotors depends on the difference between the moments-of-inertia of the rotors relative to the T—T axis and L—L axis. The greater is this moment-of-inertia difference between the two axes, the more difficult it is to break free of a lock-in mode (output shaft angular velocity=input shaft angular velocity). With reference to rotor 120, this rotor configuration results in a relatively less moment-of-inertia about the L—L axis so that there is a greater difference in the moments-of-inertia between the two axes, T—T and L—L. The rotor 122 has a greater mass at the "bow-tie" ends thereof than rotor 120 so that a lesser difference exists between the moments of inertia about its T—T and L—L axes. The rotor 124 has yet a greater mass. This ratio of the moments-of-inertia of rotor 122 is relatively greater than that of rotor 124 relative to its moment of inertia ratio respecting axes T—T and L—L. As a consequence, these rotors 122, 124 are not capable of providing as great a locking torque as that provided by rotor 120. It should be evidenced from this that, if the contour of the bow-tie rotor is increased until it becomes a disk, the difference between the moments-of-inertia between the two axes T—T and L—L becomes zero. It is apparent from this latitude of rotor design, so far as its capacity, for example, of attaining the torques required for the breaking-free of the lock-in mode, or the proclivity of the drive train to transform into the lock-in mode, that precise tailoring of great latitude, of the requisite parameters, are possible for performance optimization. Thus the rotor configuration and mass quantity, respecting ratios of inertial moments about the T—T and L—L as well as about the E—E axes, will greatly differ when its inertial transmission is to be driven by a 1.4 liter power plant rather than, for example, by a 5.3 liter unit.

FIGS. 6A–6I exemplify a rotor design which maximizes the difference between the minimum radius-of-gyration and the maximum radius-of-gyration relative to the T—T and L—L axes when counter-rotating rotors are used. In this embodiment, the L—L axis is located "inside" or through each counter-rotating body. The counterrotating rotor assembly includes a pair of counterrotating rotors 126, 128. The rotor 126 includes a first mating section 130 and a second mating section 132. The rotor 128 is held between the two mating sections 130, 132. The rotor 128 includes a hub 134 which is axially aligned with the hub 136 and integral with the second mating section 132. The rotor 128 rotates within the rotor 126.

With reference to FIGS. 7A–7C, a counterrotating rotor pair configuration is shown which is characterized in that each rotor 138 is identically configured and each rotor 138 is engineered to provide a dynamically balanced rotor 138.

With reference to FIGS. 8A and 8B, a rotor configuration is shown which is characterized by the use of a single rotating rotor 140, rather than two counterrotating rotors. In this embodiment, the single rotor 140 is connected to and driven by the pinion 142 while the pinion 144 acts as a symmetry idler.

A second embodiment of the present invention is illustrated in FIGS. 9–12. In FIG. 9, a transmission unit 146 is depicted. The transmission unit 146 is coupled to an input shaft 148 and an output shaft 150. Like transmission unit 20, transmission unit 146 includes a forward transmission housing 152 and a rear transmission housing 154. This second embodiment differs from the transmission unit 20 in two significant respects. First, transmission unit 146 does not have an input one-way clutch coupled thereto. Second, transmission unit 146 also differs in that a relatively massive, tapered forward bearing support 156 has been substituted for the forward clutch housing 26 of the transmission unit 20 while a rear bearing support 158 has been substituted for the reverse clutch housing 32 although rear bearing support 158 continues to constitute a reverse clutch housing. The forward bearing support 156 is surrounded by a lesser housing bearing 160 while the rear bearing support 158 is surrounded by a greater housing bearing 162. Shoulders and retaining ring grooves are formed in the forward bearing support 156 and rear bearing support 158 for mounting the lesser housing bearing 160 and greater housing bearing 162, respectively. A chassis tapered shaft 164 is locked into the forward bearing support 156. The chassis tapered shaft 164, such as a Morse with a closely three-degree included angle, is further locked by the press-fitting of the dowel pin 166 which in turn, is held in place by the lesser housing bearing 160. The lesser housing bearing 160 is secured in place by an external retaining ring 168. Since no input clutch is included, the input shaft, rotor chassis and rear shaft become a common link.

With reference to FIGS. 10, 11, and 12, three transmission units 146 are shown. The three transmission units 146 are mechanically geared in a parallel cooperative manner. A first transmission unit 146 is attached to a first forward driven gear 170. A second transmission unit 146 is attached to a second forward driven gear 172. A third transmission unit 146 is attached to a third forward driven gear 174. The forward driven gears 170, 172, 174 and the three transmission units 146 are arranged according to a 120° phase relation with respect to one another as regards the movement of each of their rotors (not shown) but symbolized by the key/key way angular positions as shown at the ends of shafts 176, 178, 180, respectively. Each of the forward driven gears 170, 172, 174 rotates or is driven about the shafts 176, 178, 180, respectively. The forward driven gears 170, 172, 174 are of equal pitch diameters and of a proper diametral pitch and tooth pressure angle to properly engage with a forward drive gear 182. The forward drive gear 182 must also include a pitch diameter identical to that of the forward driven gears 170, 172, 174. The forward drive gear 182 rotates about a compound input shaft 184. If the compound input shaft 184 is rotated counterclockwise one revolution, and its forward drive gear 182 is of common pitch diameter, the three shafts 176, 178, 180 each rotate clockwise one revolution.

Each of the three transmission units 146 is also coupled to one of three rear driving gears 186. Each of the rear driving gears 186 rotates about respective output shafts 188. Each of the output shafts 188 is coupled to one of the three transmission units 146. The three rear driving gears 186 are individually meshed with a compatible rear driven gear 189, which is keyed to a compound output shaft 190.

The forward drive gear 182 is keyed to the compound input shaft 184 as shown in FIG. 11. The internal end of the compound input shaft 184 is rotatably mounted, by conventional means, to the bores in a bearing set housed within the forward bearing box 192. The forward bearing box 192 is integral with a forward bearing plate 194. The internal end of the compound output shaft 190 is similarly mounted within the bores of a bearing set housed within the rear bearing box 196. Rear bearing box 196 is integral with a rear bearing plate 198. Further details of these bearing assemblies are not illustrated since they are conventional in nature.

Spacer posts with precision referenced shoulders and internally threaded ends 200, 202 together with a grooved base 204 provide a chassis for rotatably mounting the transmission units 146. The lesser housing bearings 160 are fixedly positioned in the forward bearing plate 194 while the greater housing bearings 162 are permitted to axially float in the rear bearing plate 198. A main housing 206 in conjunction with main housing gaskets (not shown) provide a protective enclosure against unwanted foreign matter, mechanical abuse and windage losses. The main housing 206 includes a forward gear housing (not shown) and a rear gear housing 208, as well as forward gear housing gasket (not shown) and a rear gear housing gasket (not shown). A compound shaft seal (not shown) is attached to the forward gear housing and a compound shaft seal 212 is attached to the rear gear housing 208.

In operation, the synchronized, 120° phased rotations of the three transmission units 146 together act to produce what can be defined as a "gliding inertial wave". Angular momentum, kinetic energy, and power do not reverse flow into the power source in the absence of an input one-way clutch. Rather, the three phase, rotating wave reflects the efficient displacement or interchange of angular momentum, kinetic energy and power between the transmission units 146 by way of the forward driven gears 170, 172, 174 in their interaction with the forward drive gear 182. If the 120° balanced phase is changed to an unbalanced condition, for example, inefficiencies develop such that portions of the angular momentum, kinetic energy and power circulate ineffectively between the power source and the transmission units 146.

Although a balanced three phase transmission is schematically depicted in FIGS. 10, 11 and 12, the present invention is not limited in scope to a three phase concept. Even though the balanced three-phase version is a preferred embodiment of compounding transmission units 146, other phase compounding can include two phase, four phase, five phase and so forth. In addition, although the efficiency of the transmission decreases, unbalanced phasing of the transmission units 146 can be provided. Such unbalancing of the compound transmission units 146 can be utilized to engineer the locking torque magnitude of the transmission. Also, the compounding of transmission units is not limited to the transmission units 146. The transmission units 20 can also be compounded in a manner shown in FIGS. 9–12. It is also understood that in compounding transmission units 20 or 146, the output one-way clutch can be removed so that a common link is formed between the bevel ring gear 46, ring gear support member 48, rear output shaft 54, output clutch housing 42, and output shaft 24. In this case, only the reverse one-way clutch 44 would be incorporated in this compounded inertial transmission.

It is to be understood, in the compounding of these inertial transmission units, that such compounding is not limited to the parallel orienting of the input/output shafts of axes P—P. It is obvious that skewed and other angled orientations, such as radial, of axes P—P may be preferred dependent upon space and mounting specifications such as flange rather than base mounted. If so, spur gears would be replaced by the appropriate gear sets required to accommodate the angles, whether intersecting or non-intersecting, existent between the various axes P—P. Consequently, hypoid, spiroid, helical, bevel, miter and worm gears, among others, are available.

In a third embodiment of the present invention, as illustrated in FIGS. 13 and 14, a different configuration of links and one-way clutches is provided in a transmission unit 214 to permit flow of angular momentum, rotational kinetic energy, and power without either a rotational movement of a housing or of a stationary housing. Whereas the first two embodiments were designed for operation within a harsh, ambient environment of abrasive, foreign matter and chemically corrosive atmospheres, this third embodiment is designed for application within, e.g., a shared housing such as might be envisioned in the instance of the vehicular cross-wise mounting of an I.C. engine in which the crankshaft, transmission and differential linkages are mutually housed. As seen in FIGS. 13 and 14, an input shaft 216 is joined to, or integral with, a first forward shaft 218. The first forward shaft 218, in turn, is joined to, or integral with, a second forward shaft 220. The first forward shaft 218 is coupled to an input one-way clutch 222. Input one-way clutch 222 couples the rotary motion of the input shaft 216 to a clutch housing chassis 224 when the input shaft 216 is driven in a predetermined manner, for example, the direction illustrated by the vector 226. The clutch housing chassis 224 is rigidly joined to shafts 228, 230 at their locking tapered and steel-pinned ends 232, 234, respectively. Rotors 236, 238 having inertial half-mass centroids near their mass end portions 240, 242, respectively, are rotatively coupled to each of the shafts 228, 230, respectively, by bearing assemblies 244. The bearing assemblies 244 permit counter-rotational movement of the rotors 236, 238 about their respective rotor axis R—R. In addition to this counter-rotational movement, the rotors 236, 238, which have bevel gears 246, 248 as respective, integral portions thereof, as well as clutch housing chassis 224, rotate about a primary axis P—P such that the teeth of bevel gears 246, 248, respectively, engage the bevel gear teeth of a tubular gear body 250. The bevel gear body 250 is coupled to a rear shaft 252 through an output one-way clutch 254. The output one-way clutch 254 couples rotational motion to an output shaft 256 when the gear body 250 is rotated in a predetermined direction, such as the direction illustrated by vector 226. The rotors 236, 238 having inertial mass end portion 240, 242 respectively, of the transmission unit 214 function like the rotors 92, 94 having inertial masses 93, 95, 96, 97 previously described in providing radii-of-gyration changes to supply power in the form of angular velocity or torque to the output shaft 256, depending upon the load coupled thereto.

A significant difference present in this embodiment is the path provided for the flow of angular momentum whenever the angular momentum flow is reversed such that the flow thereof is towards the input shaft 216. In this embodiment, the reverse flow is coupled directly from the output shaft 256 to the second forward shaft segment 220, first forward shaft segment 218, and the integral input shaft 216 through a reverse one-way clutch 258. This flow path is in contrast to the flow path of transmission units 20, 146 in which the flow is directed outwardly in enveloping configuration of the rotor chassis through the transmission housing to the input shaft. It is noted, for the sake of clarification, that input shaft 216, first forward shaft segment 218, and second forward shaft segment 220 are one shaft link of varying cross-sections. This is also true of the rear shaft 252 and the output shaft 256, it being pointed out that the forward end of this link houses the reverse one-way clutch 258. It is also noted, regarding assembly procedure, that the major diameter of the rear portion of the rear shaft 252 must be capable of passing through the minimum diameter of the clutch housing chassis 224 as indicated in FIG. 13.

Another embodiment of the present invention which utilizes the transmission of angular momentum in the form of torque and angular velocity to an output shaft is illustrated in FIGS. 15, 16 and 17. This embodiment does not include gears for proper operation. Rather, angular momentum is transmitted, or "pumped", by a linkage system devoid of gears. For clarity of illustration, FIGS. 15 and 16 illustrate a dynamically unbalanced, though operable, inertial transmission. FIG. 17 schematically depicts a displacement vector diagram of FIGS. 15 and 16 with respect to link component forces, in order to make apparent the asymmetry of the inertial vector forces acting on the crank link needed for generating the crank effort required for torque/angular velocity production.

With reference thereto, an input shaft 260 is integrally joined to a first casing 262. The first casing 262 is rigidly attached to a second casing 264 as illustrated. Input one-way clutches 266 and 270 tandemly couple rotational motion between casings 262, 264, respectively, and crank link 272 in predetermined direction. The crank link 272 is rotatively fastened to a connecting-rod body 274. An inertial mass 276 is rigidly connected to the connecting-rod body 274 so as to form a single link. The crank link 272 is also rigidly connected to an output shaft 278, which has a seal 279 held thereabout. The inertial mass 276 is connected to the casings 262, 264 by means of yoke link 284 using connection bearings 280, 281 and 282, 283 respectively.

In explaining the operation of the inertial transmission embodiment of FIGS. 15 and 16, assume initially that the output shaft 278 is prevented from rotational movement while the input shaft 260 is driven with a predetermined angular velocity. The first casing 262 and the second casing 264 are both integrally joined to the input shaft 260 and will therefore rotate with this same predetermined angular velocity. The yoke thrust link 284 drives, either in tension or compression, the inertial mass 276 about the axis X—X of its varying connection to the crank link 272. The inertial mass 276 moves through an eccentric path about the axis S—S of the output shaft 278. The inertial mass 276 cyclically varies between its maximum and minimum radius-of-gyration to cyclically vary the angular momentum content of the inertial mass 276 with respect to this axis S—S. A vector analysis representation of the embodiment of FIGS. 15 and 16 is seen in FIG. 17. As represented, an asymmetry of crank effort is depicted and a net crank effort acts upon the output shaft 278. If the output shaft 278 is then unlocked, in order to permit power transmission, the force vector analysis becomes even more complex but a net vector still is present to provide a net transmission of angular momentum, power and kinetic energy so as to provide an apportioning of torque and angular velocity values.

Yet another embodiment of the present invention utilizing a gearless, crank link effect but, more specifically, a multiple eccentric link as illustrated, has a number of inertial masses 286 as depicted in FIGS. 18 and 19. Similar to the previous embodiment, the inertial masses 286 are only symbolically represented for ease of understanding and for clarity of illustration since optimized masses would mask the intent of schematic portrayal. The inertial masses 286 may be configured in various forms within the scope of this invention and unlike the embodiment of FIGS. 15 and 16 this embodiment is dynamically balanced in operation.

As depicted in the FIGS. 18, 19, an input shaft 288 is coupled through an input one-way clutch 290, and rotatively supported by bearing 292, to a first casing 294. The first casing 294 is integrally joined to a second casing 296. Three thrust links 298 are each pivotally attached at 120 degree locations about the inner peripheral surfaces of the first and second casings 294, 296, respectively, by means of three respective bearing shafts 300 whose axes parallel the input shaft 288 axis. The three thrust links 298 are, in turn, pivotally attached by bearing sets to the three respective inertial masses 286 by virtue of respective yoke 302 configured ends of the thrust links 298. Eccentric member 304 is of hollow bore construction. Contained concentrically within the bore, and extending beyond at both ends, is the output shaft 306. Eccentric member 304 is coupled through an output one-way clutch 308 to output shaft 306 and rotatively supported by bearings, not shown, to the output shaft 306. Output shaft 306 is coupled through a reverse one-way clutch 310 to the input shaft 288. The forward end of the output shaft 306 is rotatively supported by bearing 312. The rearward portion of the output shaft 306 is rotatively supported by a bearing 314 which, conversely, supports the rear portion of the integrally structured first and second casing units 294, 296. Bearing 314 is secured to the second casing unit 296 by means of a seating shoulder and an internal retaining ring by means of an integral bearing shield 315 which also seals against foreign matter penetration. Integrally featured on eccentric member 304 are inner component portions or journals of five eccentric bearings consisting of two, paired, lesser bearing sets and one greater bearing. These five eccentric journal units are axially located along the eccentric member 304 as machined and ground bearing surfaces identically as are those of the concentrically inner bearing portions or journals of, e.g., a crankshaft structure of multiple cranks. This axial locating is such that a greater journal 316 is juxtaposed by one pair of the lesser journal sets 318, 318. In turn, this group of three eccentric journals 318, 316, 318 is juxtaposed by the remaining lesser journals pair 320, 320 of the five journals. Each of these five bearing journals 320, 318, 316, 318, 320 are of equal eccentric throw equivalent to crank radii. A 120 degree phase relation is existent between the major eccentric radii of the two lesser journals as well as between the major eccentric radii of the two lesser journals and the major eccentric radius of the greater journal. Thus eccentric member 304 and the five eccentric bearing journals 320, 318, 316, 318, 320 together form one link. Two of the three inertial mass units posses integral dual link extensions 322, 324 which, in turn, possess one-half of the outer sleeve bearings of eccentric journals 318, 320 respectively. The third inertial mass unit possesses a more massive single link extension 326 which, in turn, possess one-half of the outer sleeve bearing of eccentric journal 316. Five respective sleeve bearing caps complete the bearing structures but are not further described due to their mundane nature.

This embodiment then provides for a dynamically balanced inertial transmission since all three inertial masses are caused to oscillate in unison between their maximum-to-minimum-to-maximum radii-of-gyration positions in planar motion such that no vector components of undesirable, vibratory, torque moments appear about an axis normal to the input/output shafts' common axis.

Rotation of the input shaft 288, in the angular displacement direction of vector 328, drives the casings 294, 296 in the same rotational sense because of being coupled by the input one-way clutch 290 which, in turn, cyclically drives the inertial masses 286 through their radii-of-gyration oscillatory motions by the combined means of the three respective thrust links 298 and the respective link extension portions 322, 324, 326 of the three inertial masses 286 in their eccentric journal bearing attachments 320, 318, 316, 318, 320 to the eccentric member 304 provided the input shaft 288 has a greater angular velocity than does the output shaft 306. The eccentric member 304 drives the output shaft 306 because of coupling by the output one-way clutch 308. The reverse one-way clutch 310 permits engine braking by any vehicle incorporating the mechanism. In addition, the reverse one-way clutch 310 permits reverse driving of the vehicle by a straight mechanical linkage, without benefit of the inertial linkage, while the input one-way clutch 290 and the output one-way clutch 308 prevent any unwanted reverse flow of angular momentum rotational kinetic energy and power through the inertial eccentric linkage of the transmission unit.

Although the present invention has been described with reference to a plurality of embodiments, it is readily understood that further variations and modifications can be effected within the spirit and scope of this invention such as the use of conventional I.C., four-cycle crankshafts in which the inertial masses 286 would be so divided and distributed as to provide dynamic balancing as their collective radii-of-gyration oscillated in unison.

What is claimed is:

1. A method for converting torque to angular velocity and angular velocity to torque using angular momentum in which a transmission apparatus is utilized and less than three axes of rotation of the transmission apparatus are required for providing torque and angular velocity to a changing load, comprising:
   supplying power to an input means having an input axis to impart angular velocity to said input means;
   providing a transmission means including a first body, a second body, and a first shaft means and a second shaft means separate from each other, each of said first body and said second body having a center of mass, an axis of rotation, an axis of symmetry being less than a three-fold axis of symmetry, a longitudinal axis, a first surface area, and a second surface area, each of said first shaft means and said second shaft means having a longitudinal axis;
   providing output means having an output axis;
   connecting said output means to a changing load;
   providing said output axis in parallel with said input axis;
   forming each of said first surface areas of said first body and said second body so that each thereof is less than its second surface area;
   locating said axis of rotation of each of said first body and said second body perpendicular to its second surface area;
   securing said first body to said first shaft means in an axial direction along said axis of rotation of said first body;
   securing said second body to said second shaft means in an axial direction along said axis rotation of said second body;
   keeping said axis of rotation of each of said first body and said second body in alignment with its center of mass;
   maintaining said axis of rotation of each of said first body and said second body perpendicular to its longitudinal axis;
   causing said angular velocity of said input means to be different from the angular velocity of said output means;
   rotating said first body about said axis of rotation of said first body in a first direction;
   rotating said second body about said axis of rotation of said second body in a second direction opposite said first direction;
   rotating each of said first shaft means and said second shaft means about its longitudinal axis and wherein said first shaft means rotates in a direction opposite the rotation of said second shaft means;
   moving each of said first body and said second body along a three-dimensional path;
   rotating said output means 360° using said power, said input means and said transmission means to provide torque and angular velocity to the changing load;
   maintaining said axis of rotation of each of said first body and said second body continuously fixed relative to its axis of symmetry;
   continuing rotation of each of said first body and said second body about its axis of rotation so long as the angular velocity of said input means is different from the angular velocity of said output means; and
   causing a cyclic changing of the moment of inertia, from a predetermined fixed minimum value to a predetermined fixed maximum value, of each of said first body and said second body relative to said output axis when the angular velocity of said input means is different from the angular velocity of said output means.

2. A transmission appartus for converting torque to angular velocity and angular velocity to torque using angular momentum in which less than three axes of rotation of the transmission apparatus are required for providing torque and angular velocity to a changing load, comprising:
   a source of power;
   an input means having an input axis being connected to said source of power;
   an output means having an output axis and being connected to the changing load, said output means rotating 360° using the power supplied to said input means by said source of power, said output axis being parallel to said input axis;

transmission means connected to said input means and said output means, said transmission means including a first body, a second body, and means for moving each of said first body and said second body, said means for moving connected to each of said first body and said second body, said first body and said second body being operatively connected to said output means and said input means such that a cyclic, continuous changing of the moment of inertia, from a predetermined, fixed minimum value to a predetermined fixed maximum value, of said first body and said second body relative to said output axis occurs when the angular velocity of said input means is different from the angular velocity of said output means and a fixed moment of inertia of said transimission means is minimized, and wherein each of said first body and said second body includes:

a first surface area, a second surface area, said first surface area being less in area than said second surface area, an axis of rotation perpendicular to its second surface area, a center of mass wherein its axis of rotation continuously passes through said center of mass, a longitudinal axis wherein its axis of rotation is continuously perpendicular to said longitudinal axis, and an axis of symmetry being less than a three-fold axis of symmetry, and wherein said means for moving includes:

first means connected to said output means for moving each of said first body and said second body along a three-dimensional path, said first body moving in a counter-rotating manner relative to said second body, said first means including a first shaft means and a second shaft means, said first shaft means being connected to said first body and said second shaft means being separate from said first shaft means and being connected to said second body, second means connected to each of said first body and said second body for fixedly attaching each of said first body and said second body in an axial direction along its axis of rotation, and third means connected to said second means for use in permitting rotation of each of said first body and said second body about its axis of rotation, each of said first body and said second body axis of rotation being continuously fixed relative to its axis of symmetry during rotation of each of said first body and said second body, said third means including first bearing means and second bearing means, said first bearing means located adjacent to said first shaft means wherein said first shaft means rotates about said longitudinal axis of said first shaft means, said second bearing means located adjacent to said second shaft means wherein said second shaft means rotates about said longitudinal axis of said second shaft means.

3. An apparatus, as claimed in claim 2, wherein said first means further includes:

a bevel ring gear; and at least a first bevel pinion gear engaging said bevel ring gear.

4. An apparatus, as claimed in claim 2, wherein:

said first means includes at least a first bevel pinion gear connected to said first shaft means and said first bearing means is positioned between said first bevel pinion gear and said first body.

5. An apparatus, as claimed in claim 2, wherein:

said first body includes a hollow portion and has a size greater than said second body and wherein said second body moves through said hollow portion of said first body during the counter-rotation of said first body relative to said second body.

6. An apparatus, as claimed in claim 2, further including:

first drive control means connected to said input means and said transmission means for preventing the driving of said input means using said transmission means; and second drive control means connected to said transmission means and said output means for preventing the reverse flow of angular momentum from said output menas to said transmission means.

* * * * *